(12) United States Patent
Katayama et al.

(10) Patent No.: US 12,583,451 B2
(45) Date of Patent: Mar. 24, 2026

(54) DRIVING SUPPORT SYSTEM

(71) Applicant: HONDA MOTOR CO., LTD., Tokyo (JP)

(72) Inventors: Makoto Katayama, Tokyo (JP); Hiroki Tanaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 292 days.

(21) Appl. No.: 18/343,750

(22) Filed: Jun. 29, 2023

(65) Prior Publication Data
US 2024/0001920 A1 Jan. 4, 2024

(30) Foreign Application Priority Data
Jul. 1, 2022 (JP) ................................. 2022-107263

(51) Int. Cl.
*B60W 30/16* (2020.01)
*G06V 20/58* (2022.01)
*G08G 1/00* (2006.01)

(52) U.S. Cl.
CPC .............. *B60W 30/16* (2013.01); *G08G 1/22* (2013.01); *B60W 2300/36* (2013.01); *B60W 2520/10* (2013.01); *B60W 2554/4042* (2020.02); *B60W 2720/10* (2013.01); *G06V 20/58* (2022.01)

(58) Field of Classification Search
CPC .................................. B60W 30/16; G08G 1/22
See application file for complete search history.

(56) References Cited

U.S. PATENT DOCUMENTS

| | | | |
|---|---|---|---|
| 2017/0144665 A1 | 5/2017 | Ohashi et al. | |
| 2019/0225142 A1* | 7/2019 | Switkes | ................ B60Q 1/507 |
| 2019/0248367 A1* | 8/2019 | Knitt | ................... B60W 10/184 |
| 2020/0384994 A1 | 12/2020 | Pfau | |

(Continued)

FOREIGN PATENT DOCUMENTS

| | | |
|---|---|---|
| DE | 102019214121 A1 | 3/2021 |
| JP | 2016034819 A | 3/2016 |
| JP | 2019099033 A | 6/2019 |

(Continued)

OTHER PUBLICATIONS

Notification of Reasons for Refusal issued Jul. 29, 2025 in the JP Patent Application No. 2022-107263.

*Primary Examiner* — Imran K Mustafa
(74) *Attorney, Agent, or Firm* — CKC & Partners Co., LLC

(57) ABSTRACT
A driving support control apparatus acquires forward information regarding a state ahead of an own vehicle V3, sets a preceding vehicle as a tracking target and executes tracking control of causing the own vehicle to automatically track this tracking target. While an offset preceding vehicle V2 traveling laterally ahead of the own vehicle and a front preceding vehicle V1 traveling ahead of the offset preceding vehicle V2 and traveling at a closer position than the offset preceding vehicle V2 along a vehicle width direction are recognized, the driving support control apparatus sets the offset preceding vehicle V2 as the tracking target in a case where a distance between the two preceding vehicles V1 and V2 is greater than a predetermined distance threshold and sets the front preceding vehicle V1 as the tracking target in a case where the distance between the preceding vehicles is less than the distance threshold.

18 Claims, 22 Drawing Sheets

(56) References Cited

U.S. PATENT DOCUMENTS

| 2021/0162998 | A1 | 6/2021 | Pfau |
| 2021/0197816 | A1 | 7/2021 | Horn et al. |

FOREIGN PATENT DOCUMENTS

| JP | 2019099034 | A | 6/2019 |
| JP | 2021535029 | A | 12/2021 |
| WO | 2019180875 | A1 | 9/2019 |

* cited by examiner

V1

V2

V3

V4

DISTANCE BETWEEN PRECEDING VEHICLES

DISTANCE BETWEEN PRECEDING VEHICLES

DRIVING SUPPORT SYSTEM

This application is based on and claims the benefit of priority from Japanese Patent Application No. 2022-107263, filed on 1 Jul. 2022, the content of which is incorporated herein by reference.

BACKGROUND OF THE INVENTION

Field of the Invention

The present invention relates to a driving support system. More specifically, the present invention relates to a driving support system of a saddle type vehicle, which supports maintenance of platooning in a zigzag pattern by a plurality of saddle type vehicles including an own vehicle, through tracking control.

Related Art

In so-called group riding in which a plurality of motor-cycles move toward a common destination in a group, the motorcycles often perform platooning (so-called, traveling in a zigzag manner) while keeping a so-called zigzag pattern. The term zigzag pattern refers to a formation constituted by alternately offsetting traveling positions of respective vehicles along a vehicle width direction like footprints of a plover. In such traveling in a zigzag manner, each of riders of the third and subsequent vehicles from a lead vehicle needs to cause the own vehicle to track two preceding vehicles traveling ahead of and laterally ahead of the own vehicle while paying attention to distances between at least the two preceding vehicles and the own vehicle to keep the formation. Thus, traveling while keeping the for-mation imposes a large burden on a rider who is unaccus-tomed to platooning.

By the way, in recent years, to improve traffic safety, spread of a preceding vehicle tracking control function (hereinafter, sometimes also abbreviated as "ACC (adaptive cruise control) function") to motorcycles is underway (see, for example, Patent Document 1). The ACC function refers to a function of, in a case where a preceding vehicle traveling at speed less than setting vehicle speed determined in advance can be recognized, automatically controlling a distance between an own vehicle and the preceding vehicle and own vehicle speed so as to cause the own vehicle to automatically track the preceding vehicle.

In a driving support system of a motorcycle disclosed in Patent Document 1, in a case where a plurality of preceding vehicles that can be set as a tracking target are detected, information regarding these preceding vehicles is displayed at a display that can be visually confirmed by a rider, and one of the plurality of preceding vehicles selected by the rider can be set as a tracking target. Thus, in a case where the own vehicle travels in a zigzag manner as the third or subsequent vehicle as described above, there is a case where a burden on the rider for keeping a formation can be reduced by utilizing the invention disclosed in Patent Document 1.

Patent Document 1: PCT International Publication No. WO2019/180875

SUMMARY OF THE INVENTION

However, in the invention disclosed in Patent Document 1, the rider needs to manually set the tracking target by operating a selector at an appropriate timing in accordance with states of two preceding vehicles. Thus, a rider who is unaccustomed to platooning cannot set the tracking target at an appropriate timing, which may result in disrupting the formation.

An object of the present invention is to provide a driving support system capable of reducing a burden on a rider during platooning in a zigzag pattern by three or more saddle type vehicles including an own vehicle.

(1) A driving support system according to the present invention includes a forward information acquirer config-ured to acquire forward information regarding a state ahead of an own vehicle that is a saddle type vehicle, and a driving support controller configured to set a preceding vehicle recognized on the basis of the forward information as a tracking target and execute tracking control of causing the own vehicle to automatically track the tracking target, and, while a first preceding vehicle that is a saddle type vehicle traveling laterally ahead of the own vehicle and a second preceding vehicle that is a saddle type vehicle traveling ahead of the first preceding vehicle along a traveling direc-tion and traveling at a closer position than the first preceding vehicle along a vehicle width direction are recognized on the basis of the forward information, the driving support con-troller sets the first preceding vehicle as the tracking target in a case where a distance between preceding vehicles that is a distance between the first preceding vehicle and the second preceding vehicle is greater than a predetermined distance threshold, and sets the second preceding vehicle as the tracking target in a case where the distance between the preceding vehicles is less than the distance threshold.

(2) In this case, the driving support system preferably further includes a rearward information acquirer configured to acquire rearward information regarding a state behind the own vehicle, and the driving support controller includes as control modes of the tracking control, a first platooning mode in which the tracking target is set on the basis of the distance between the preceding vehicles while the first preceding vehicle and the second preceding vehicle are recognized, a second platooning mode in which while an offset preceding vehicle that is a saddle type vehicle trav-eling laterally ahead of the own vehicle and an offset subsequent vehicle that is a saddle type vehicle traveling laterally behind the own vehicle are recognized on a basis of the forward information and the rearward information, the offset preceding vehicle is set as the tracking target, and a normal tracking mode in which a preceding vehicle recog-nized on the basis of the forward information is set as the tracking target, and is capable of executing the tracking control under one of the control modes.

(3) In this case, the driving support system preferably further includes an information presenter configured to, in a case where the first preceding vehicle and the second preceding vehicle that satisfy a predetermined first platoon-ing condition are recognized on the basis of the forward information, present first information indicating that the tracking control is executable under the first platooning mode to a rider of the own vehicle, and an operation accepter configured to accept approval operation by the rider, and in a case where the approval operation is accepted by the operation accepter after the first information is presented by the information presenter, the driving support controller preferably starts the tracking control under the first platoon-ing mode.

(4) In this case, in a case where the offset preceding vehicle and the offset subsequent vehicle that satisfy a predetermined second platooning condition are recognized on the basis of the forward information and the rearward information, the information presenter preferably presents second information indicating that the tracking control is executable under the second platooning mode to the rider, and in a case where the approval operation is accepted by the operation accepter after the second information is presented by the information presenter, the driving support controller preferably starts the tracking control under the second platooning mode.

(5) In this case, the driving support system preferably further includes an operation accepter configured to accept setting operation by the rider, and, in a case where first mode setting operation for setting the first platooning mode as one of the control modes is accepted by the operation acceptor, the driving support controller preferably starts the tracking control under the first platooning mode in response to the first preceding vehicle and the second preceding vehicle that satisfy a predetermined first platooning condition being recognized on the basis of the forward information.

(6) In this case, in a case where second mode setting operation for setting the second platooning mode as the control mode is accepted by the operation acceptor, the driving support controller preferably starts the tracking control under the second platooning mode in response to the offset preceding vehicle and the offset subsequent vehicle that satisfy a predetermined second platooning condition being recognized on the basis of the forward information and the rearward information.

(7) In this case, the driving support controller sets speed obtained by adding a predetermined value to own vehicle speed at the time of start of the tracking control under the first platooning mode as setting vehicle speed, causes the own vehicle to automatically track the tracking target within a range in which the own vehicle speed does not exceed the setting vehicle speed, and in a case where vehicle speed of the tracking target constantly exceeds the setting vehicle speed, cancels the tracking control.

(8) In this case, the driving support controller sets speed obtained by adding a predetermined value to own vehicle speed at the time of start of the tracking control under the second platooning mode as setting vehicle speed, causes the own vehicle to automatically track the tracking target within a range in which the own vehicle speed does not exceed the setting vehicle speed, and in a case where vehicle speed of the tracking target constantly exceeds the setting vehicle speed, cancels the tracking control.

(9) In this case, in a case where the offset preceding vehicle decelerates and goes out of a detection range of the forward information acquirer while the tracking control is executed under the second platooning mode, the driving support controller estimates a position of the offset preceding vehicle on the basis of a position of a front end portion of the offset subsequent vehicle recognized on the basis of the rearward information and continuously executes the tracking control on the basis of a result of the estimation.

(1) In a driving support system according to the present invention, in a case where while a first preceding vehicle travelling laterally ahead of an own vehicle and a second preceding vehicle traveling ahead of the first preceding vehicle along a traveling direction and traveling at a closer position than the first preceding vehicle along a vehicle width direction are recognized on the basis of forward information, that is, while the own vehicle is traveling at the third or subsequent position from a lead vehicle in traveling in a zigzag manner by three or more saddle type vehicles, a driving support controller sets the first preceding vehicle as a tracking target in a case where a distance between preceding vehicles that is a distance between the first preceding vehicle and the second preceding vehicle is greater than a predetermined distance threshold, and sets the second preceding vehicle as the tracking target in a case where the distance between the preceding vehicles is less than the distance threshold. By this means, in a case where the first preceding vehicle ahead of the own vehicle is traveling while keeping an appropriate distance between vehicles with respect to the second preceding vehicle traveling laterally ahead of the first preceding vehicle, it is possible to cause the own vehicle to automatically track the first preceding vehicle traveling laterally ahead of the own vehicle while keeping an appropriate distance between vehicles. Further, in a case where the second preceding vehicle decelerates for some reason and as a result of this, a distance between the first preceding vehicle and the second preceding vehicle becomes shorter, it is possible to cause the own vehicle to automatically track the second preceding vehicle traveling ahead of the own vehicle in the traveling direction while keeping an appropriate distance between vehicles. Thus, according to the present invention, the tracking target can be automatically switched at an appropriate timing in accordance with acceleration/deceleration of the first and the second preceding vehicles traveling ahead of the own vehicle, so that it is possible to reduce a burden on a rider of the own vehicle during traveling in a zigzag manner.

(2) In the driving support system according to the present invention, the driving support controller includes a first platooning mode, a second platooning mode and a normal tracking mode as control modes of tracking control and can execute tracking control under one of the control modes. In the first platooning mode, the driving support controller sets a tracking target on the basis of a distance between preceding vehicles while the first preceding vehicle and the second preceding vehicle are recognized, that is, while the own vehicle is traveling at the third or subsequent position from a lead vehicle in traveling in a zigzag manner by three or more saddle type vehicles. In the second platooning mode, while an offset preceding vehicle traveling laterally ahead of the own vehicle and an offset subsequent vehicle traveling laterally behind the own vehicle are recognized on the basis of the forward information and the rearward information, that is, while the own vehicle is traveling at the second position from the lead vehicle in traveling in a zigzag manner by three or more saddle type vehicles, the driving support controller sets the offset preceding vehicle as the tracking target. Thus, according to the present invention, by tracking control being performed under one of the control modes of the first and the second platooning modes, it is possible to reduce a burden on a rider while the own vehicle is traveling at a position other than a position of the lead vehicle in traveling in a zigzag manner by three or more saddle type vehicles. Further, the driving support controller sets a preceding vehicle recognized on the basis of the forward information as the tracking target in the normal tracking mode. Thus, according to the present invention, it is possible to cause the own vehicle to automatically track an arbitrary determined tracking target, so that it is possible to reduce a burden on a rider during traveling.

(3) In the driving support system according to the present invention, the driving support controller starts tracking control under the first platooning mode in a case where approval operation is accepted by an operation accepter after first information indicating that tracking control is executable under the first platooning mode is presented to the rider. In other words, according to the present invention, tracking control under the first platooning mode is started after accepting the approval operation by the rider, so that it is possible to prevent the own vehicle from traveling in a zigzag manner with a group not intended by the rider while the rider does not intend to travel in a zigzag manner with the group.

(4) In the driving support system according to the present invention, the driving support controller starts tracking control under the second platooning mode in a case where approval operation is accepted by the operation acceptor after second information indicating that tracking control is executable under the second platooning mode is presented to the rider. In other words, according to the present invention, tracking control under the second platooning mode is started after accepting the approval operation by the rider, so that it is possible to prevent the own vehicle from traveling in a zigzag manner with a group not intended by the rider while the rider does not intend to travel in a zigzag manner with the group.

(5) In the driving support system according to the present invention, in a case where first mode setting operation for setting the first platooning mode as the control mode is accepted by the operation acceptor, the driving support controller starts tracking control under the first platooning mode in response to the first preceding vehicle and the second preceding vehicle that satisfy a predetermined first platooning condition being recognized on the basis of the forward information. Thus, according to the present invention, in a case where the rider tries to travel in a zigzag manner at the third or subsequent position from the lead vehicle by receiving support by the tracking control, the rider performs first mode setting operation and adjusts speed and a position of the own vehicle so as to satisfy the first platooning condition, thereby it is possible to automatically start tracking control under the first platooning mode.

(6) In the driving support system according to the present invention, in a case where second mode setting operation for setting the second platooning mode as the control mode is accepted by the operation acceptor, the driving support controller starts tracking control under the second platooning mode in response to the offset preceding vehicle and the offset subsequent vehicle that satisfy a predetermined second platooning condition being recognized on the basis of the forward information and the rearward information. Thus, according to the present invention, in a case where the rider tries to travel in a zigzag manner at the second position from the lead vehicle by receiving support by the tracking control, the rider performs the second mode setting operation and adjusts speed and a position of the own vehicle so as to satisfy the second platooning condition, thereby it is possible to automatically start tracking control under the second platooning mode.

(7) In the driving support system according to the present invention, the driving support controller sets speed obtained by adding a predetermined value to own vehicle speed at the time of start of tracking control under the first platooning mode as setting vehicle speed and causes the own vehicle to automatically track the tracking target within a range in which the own vehicle speed does not exceed the setting vehicle speed. Thus, according to the present invention, even in a case where the tracking target somewhat increases speed after the tracking control is started, it is possible to cause the own vehicle to track this tracking target. Further, the driving support controller cancels tracking control in a case where vehicle speed of the tracking target constantly exceeds the setting vehicle speed. Thus, according to the present invention, it is possible to prevent the own vehicle from accelerating to a speed range exceeding ability of the rider due to tracking of the tracking target traveling at vehicle speed exceeding the setting vehicle speed.

(8) In the driving support system according to the present invention, the driving support controller sets speed obtained by adding a predetermined value to own vehicle speed at the time of start of tracking control under the second platooning mode as setting vehicle speed and causes the own vehicle to automatically track the tracking target within a range in which the own vehicle speed does not exceed the setting vehicle speed. Thus, according to the present invention, even in a case where the tracking target somewhat increases speed after tracking control is started, it is possible to cause the own vehicle to track this tracking target. Further, the driving support controller cancels tracking control in a case where the vehicle speed of the tracking target constantly exceeds the setting vehicle speed. Thus, according to the present invention, it is possible to prevent the own vehicle from accelerating to a speed range exceeding ability of the rider due to tracking of the tracking target traveling at vehicle speed exceeding the setting vehicle speed.

(9) In the driving support system according to the present invention, in a case where the offset preceding vehicle decelerates for some reason and goes out of a detection range of the front information acquirer while tracking control is executed under the second platooning mode, the driving support controller estimates a position of the offset preceding vehicle on the basis of a position of a front end portion of the offset subsequent vehicle that tries to keep a predetermined distance between vehicles with respect to the offset preceding vehicle and continuously executes tracking control on the basis of a result of the estimation. Thus, according to the present invention, even in a case where the offset preceding vehicle that is the tracking target decelerates for some reason, and the offset preceding vehicle and the own vehicle travel side by side while tracking control is executed under the second platooning mode, it is possible to continue tracking control with respect to a virtual offset preceding vehicle.

BRIEF DESCRIPTION OF THE DRAWINGS

FIG. 20B is a flowchart indicating specific procedure of the automatic traveling control (when the second platooning mode is set);

DETAILED DESCRIPTION OF THE INVENTION

A configuration of a driving support system according to one embodiment of the present invention will be described below with reference to the drawings. The driving support system may also referred to as a driving assistance or driver assistance system, for example.

Figure 1:
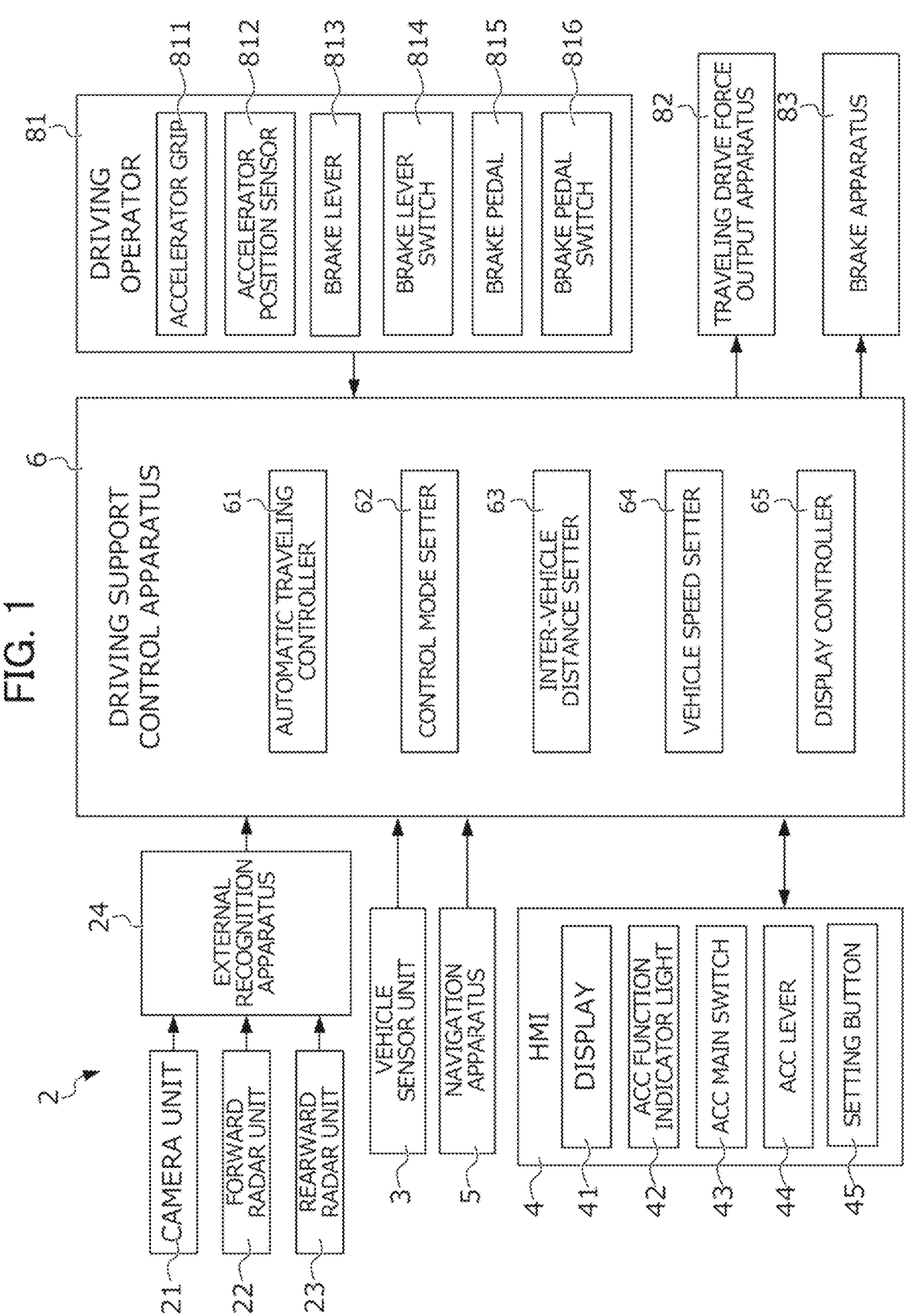
FIG. 1 is a view illustrating a configuration of a driving support system according to one embodiment of the present invention.

FIG. 1 is a view illustrating a configuration of a driving support system 1 according to the present embodiment. The driving support system 1 is mounted on a motorcycle as a saddle type vehicle (not illustrated). Note that a drive source of the motorcycle may be an internal combustion, rotating electrical machine or combination thereof. Further, a power supply of the rotating electrical machine may be a secondary battery, a capacitor or a fuel cell. Note that while a case will be described below where the driving support system 1 is applied to a motorcycle, the present invention is not limited to this. The present invention can be also applied to a saddle type vehicle such as a saddle type three-wheeled vehicle, a saddle type four-wheeled vehicle and a motorized bicycle in addition to a motorcycle.

The driving support system 1 supports safe driving of a motorcycle by a driver. In the following description, a tracking control function (hereinafter, also referred to as an "ACC function") of automatically controlling at least one selected from a distance between vehicles with respect to a preceding vehicle and vehicle speed of an own vehicle (hereinafter, also referred to as "own vehicle speed") and causing the own vehicle to automatically track the preceding vehicle will be described among various driving support functions to be implemented by the driving support system 1.

The driving support system 1 includes an external sensor unit 2, a vehicle sensor unit 3, a human machine interface 4 (hereinafter, abbreviated as HMI 4), a navigation apparatus 5, a driving support control apparatus 6, a driving operator 81, a traveling drive force output apparatus 82, and a brake apparatus 83. These apparatuses are connected to each other through a multiplex communication line such as a controller area network (CAN) communication line, a serial communication line, a radio communication network, or the like.

The external sensor unit 2 includes a camera unit 21, a forward radar unit 22, a rearward radar unit 23, and an external recognition apparatus 24.

The camera unit 21 includes, for example, a digital camera utilizing a solid state image sensor such as charge coupled devices (CCD) and a complementary metal oxide semiconductor (CMOS). The camera unit 21 is attached to an arbitrary position (for example, a front windshield, a mirror, or the like) of a front portion of a vehicle body in a state where the camera unit 21 faces ahead of the own vehicle. Each of the forward radar unit 22 and the rearward radar unit 23 includes a millimeter-wave radar that detects a target by measuring a reflected wave of radiation of a millimeter wave from the target. The forward radar unit 22 is provided at an arbitrary position (for example, a front windshield, a mirror, or the like) of a front portion of the vehicle body in a state where the forward radar unit 22 faces ahead of the own vehicle and detects an object ahead of the vehicle body. The rearward radar unit 23 is provided at an arbitrary position (for example, near a tail lamp, near right and left direction indicators) of a rear portion of the vehicle body in a state where the rearward radar unit 23 faces behind the own vehicle and detects an object behind the vehicle body.

The external recognition apparatus 24 is a computer that acquires information regarding a state ahead of the own vehicle, more specifically, information on positions, shapes, types and speed of a road and an object existing ahead of the own vehicle, content of a road traffic sign, and the like (hereinafter, also collectively referred to as "forward information") and information on a position, a shape, a type, speed, and the like, of an object existing behind the own vehicle (hereinafter, also referred to as "rearward information") by performing sensor fusion processing on detection results by part or all of the camera unit 21, the forward radar unit 22 and the rearward radar unit 23. The external recognition apparatus 24 transmits the acquired forward information and rearward information to, for example, the driving support control apparatus 6.

The vehicle sensor unit 3 includes an encoder that generates pulse signals at intervals in accordance with rotation speed of wheels, a vehicle speed sensor that detects own vehicle speed by counting the number of pulses output from the encoder upon normal rotation of the wheels, a five-axis or six-axis inertial measurement apparatus, and the like. The inertial measurement apparatus detects angles of three axes (a roll axis, a pitch axis and a yaw axis) in the vehicle body of the own vehicle, or angular velocity and acceleration. A detection signal of the vehicle sensor unit 3 is transmitted to, for example, the driving support control apparatus 6.

The HMI 4 is constituted with a plurality of interfaces that present various kinds of information to passengers of the own vehicle and accept various kinds of input operation by the passengers. FIG. 1 particularly illustrates only a display 41, an ACC function indicator light 42, an ACC main switch 43, an ACC lever 44 and a setting button 45 related to an ACC function among a plurality of interfaces constituting the HMI 4.

The display 41 is provided at a position that can be visually confirmed by a rider during driving and displays an image in accordance with a command from a display controller 65 (described later) of the driving support control apparatus 6. Mainly, various kinds of information regarding the ACC function which will be described later are displayed at the display 41.

The ACC main switch 43 is depressed by the rider upon switching of ON/OFF of the ACC function by the driving support control apparatus 6. The ACC main switch 43 is provided at, for example, a base of an accelerator grip to be gripped by the rider with his/her right hand.

The ACC lever 44 is tilted by the rider so as to change setting speed in the ACC function by the driving support control apparatus 6 or making a control mode of the ACC function transition from a standby mode which will be described later to a normal ACC mode which will be described later. The ACC lever 44 can be tilted to one of a "RES/+" side or a "SET/−" side from a neutral position. The ACC lever 44 is provided at, for example, the base of the accelerator grip.

More specifically, if the rider tilts the ACC lever 44 to the "SET/−" side when the control mode of the ACC function by the driving support control apparatus 6 is a standby mode, the control mode of the ACC function transitions to the normal ACC mode, and the own vehicle speed at that time is set as the setting vehicle speed. Further, if the rider tilts the ACC lever 44 to the "RES/+" side when the control mode of the ACC function by the driving support control apparatus 6 is the standby mode, a value stored in a memory (not illustrated) (setting vehicle speed during an immediately preceding ON state) is set as the setting vehicle speed, and the control mode of the ACC function transitions to the normal ACC mode.

Further, if the rider tilts the ACC lever 44 to the "RES/+" side when the ACC function by the driving support control apparatus 6 is in an ON state, and the own vehicle speed is equal to or higher than predetermined speed, the setting vehicle speed is increased by each predetermined unit speed (for example, 1 [km/h]). Further, if the rider tilts the ACC lever 44 to the "SET/−" side when the ACC function by the driving support control apparatus 6 is in an ON state, and the own vehicle speed is equal to or higher than predetermined speed, the setting vehicle speed is decreased by each unit speed.

The setting button 45 is constituted with a plurality of buttons to be depressed by the rider to input setting operation and approval operation regarding the control mode of the ACC function by the driving support control apparatus 6. More specifically, the setting button 45 includes four cursor buttons disposed in a cross shape for moving a cursor displayed on the display 41 in four directions, and one enter button disposed at the center of these cursor buttons. The setting button 45 is, for example, provided at a base of a handle grip to be gripped by the rider with his/her left hand.

The ACC function indicator light 42 can be lighted in a plurality of aspects such as, for example, in green and in white. The ACC function indicator light 42 is provided at a position that can be visually confirmed by the rider during driving. In a case where the ACC function is in an ON state, and tracking control or automatic vehicle speed control which will be described later is being executed, the ACC function indicator light is lighted in green. Further, in a case where the control mode of the ACC function is the standby mode, the ACC function indicator light is lighted in white. Still further, in a case where the ACC function is in an OFF state, the ACC function indicator light is turned off. Thus, in a case where the ACC main switch 43 is switched on by the rider, the ACC function indicator light is lighted in one aspect of in green and in white. Further, in a case where the ACC main switch 43 is switched off by the rider, the ACC function indicator light is turned off.

The navigation apparatus 5 includes, for example, a GNSS receiver that specifies a current position of the own vehicle on the basis of a signal received from a global navigation satellite system (GNSS) satellite, a storage apparatus storing map information, and the like. Here, the map information includes information regarding road traffic signs. The navigation apparatus 5 transmits information regarding the current position of the own vehicle to the driving support control apparatus 6 along with map information of the current position.

The driving operator 81 includes a plurality of operators to be operated by the rider when the rider drives the own vehicle, a sensor that detects operation amounts of these operators, and the like. Note that FIG. 1 particularly illustrates only an accelerator grip 811, an accelerator position sensor 812, a brake lever 813, a brake lever switch 814, a brake pedal 815 and a brake pedal switch 816 related to the ACC function among the plurality of operators and the sensor.

The accelerator grip 811 can be operated to rotate by the rider so as to accelerate/decelerate the own vehicle. The accelerator grip 811 is provided at a position at which the rider who is driving can grip the accelerator grip 811 with his/her right hand. The accelerator grip 811 is freely rotated between a fully closed position (neutral position) and a fully open position. A position of the accelerator grip 811 (hereinafter, also referred to as an "accelerator position") is returned to the neutral position by an elastic member (not illustrated) in a state where external force does not act. In the following description, a direction from the neutral position side to the fully open position side will be referred to as an open direction, and a direction from the fully open position side to the neutral position side will be also referred to as a closing direction. In other words, the rider can accelerate or decelerate the own vehicle by rotating the accelerator grip 811 in the open direction or in the closing direction between the neutral position and the fully open position in a case where the ACC function by the driving support control apparatus 6 is in an OFF state or the control mode of the ACC function is the standby mode.

Further, the accelerator grip 811 is freely rotated between the neutral position and a negative position on an opposite side of the fully open position. Note that in the following description, operation of rotating the accelerator grip 811 from the neutral position to the negative position side will be also referred to as negative operation.

The accelerator position sensor 812 is a sensor that detects rotation operation of the accelerator grip 811. The accelerator position sensor 812 detects the accelerator position and transmits a detection signal in accordance with a detected value to the driving support control apparatus 6.

The brake lever 813 is a lever that can be gripped and operated by the rider with his/her right hand to put a brake on a front wheel by the brake apparatus 83. The brake lever switch 814 is a sensor that detects ON/OFF operation of the brake lever 813. The brake lever switch 814 transmits a signal in accordance with ON/OFF operation of the brake lever 813 to the driving support control apparatus 6.

The brake pedal 815 is a pedal that can be pressed by the rider with his/her right foot to put a brake on a rear wheel by the brake apparatus 83. The brake pedal switch 816 is a sensor that detects ON/OFF operation of the brake pedal 815. The brake pedal switch 816 transmits a signal in accordance with ON/OFF operation of the brake pedal 815 to the driving support control apparatus 6.

The traveling drive force output apparatus 82 outputs traveling drive force for the own vehicle to travel to a drive wheel. The traveling drive force output apparatus 82 includes a drive source such as an internal combustion and rotating electrical machine, a transmission, and an electronic control unit that controls the drive source and the transmission on the basis of a command signal transmitted from the driving support control apparatus 6 and generates acceleration/deceleration in accordance with the command, and the like.

The brake apparatus 83 includes, for example, a brake caliper, a brake lever, a cylinder that transmits a hydraulic pressure to the brake caliper in accordance with an operation amount of the brake pedal, an electric motor that generates a hydraulic pressure to the cylinder, an electronic control unit that controls the electric motor on the basis of a command signal transmitted from the driving support control apparatus 6 and generates braking force in accordance with the command, and the like.

The driving support control apparatus 6 is a computer that performs control regarding a driving support function. The driving support control apparatus 6 includes an automatic traveling controller 61, a control mode setter 62, an inter-vehicle distance setter 63, a vehicle speed setter 64 and a display controller 65 as modules that implement the ACC function among the plurality of driving support functions.

In a case where the ACC function is in an ON state, the automatic traveling controller 61 executes automatic vehicle speed control of automatically controlling own vehicle speed on the basis of setting vehicle speed set by the vehicle speed setter 64 which will be described later or tracking control of automatically controlling a distance between vehicles with respect to a preceding vehicle on the basis of the setting vehicle speed and causing the own vehicle to automatically track the preceding vehicle. Note that hereinafter, the automatic vehicle speed control and the tracking control to be performed by the automatic traveling controller 61 will be also collectively referred to as automatic traveling control.

More specifically, the automatic traveling controller 61 includes four types of control modes of a standby mode, a normal tracking mode, a first platooning mode and a second platooning mode as controls modes of the automatic traveling control. In a case where the ACC function is in an ON state, the automatic traveling controller 61 can execute automatic traveling control under one control mode among these four types of control modes. Characteristics of each control mode will be sequentially described below.

<Standby Mode>

In a case where the control mode of the automatic traveling control is set at the standby mode, the automatic traveling controller 61 stands by for execution of the automatic traveling control so that the mode can promptly transition to other control modes (the normal tracking mode, the first platooning mode and the second platooning mode).

<Normal Tracking Mode>

In a case where the control mode of the automatic traveling control is set at the normal tracking mode, the automatic traveling controller 61 sets a preceding vehicle which is recognized on the basis of forward information, and which satisfies a tracking target condition determined on the basis of the setting vehicle speed, as a tracking target, and automatically controls a distance between the tracking target and the own vehicle along a traveling direction, thereby causing the own vehicle to automatically track the tracking target within a range in which the own vehicle speed does not exceed the setting vehicle speed. More specifically, in a case where the control mode is set at the normal tracking mode, when a preceding vehicle that satisfies the tracking target condition can be recognized on the basis of the forward information, the automatic traveling controller 61 sets the preceding vehicle as the tracking target, operates the traveling drive force output apparatus 82 and the brake apparatus 83 so that a distance between vehicles with respect to the tracking target becomes a target distance between vehicles sequentially set by the inter-vehicle distance setter 63 which will be described later and executes tracking control of causing the own vehicle to track the tracking target. Note that in the present embodiment, a distance between the own vehicle and the tracking target is defined as a distance along the traveling direction between a front end portion of the own vehicle and a rear end portion of the tracking target except a case where tracking control is performed on a virtual tracking target under the second platooning mode which will be described later.

Further, in a case where the control mode of the automatic traveling control is set at the normal tracking mode, and a preceding vehicle that satisfies the tracking target condition cannot be recognized on the basis of the forward information, the automatic traveling controller 61 automatically controls the own vehicle speed specified by the vehicle sensor unit 3. More specifically, in a case where the control mode is set at the normal tracking mode, and a preceding vehicle that satisfies the tracking target condition cannot be recognized on the basis of the forward information, the automatic traveling controller 61 executes automatic vehicle speed control of operating the traveling drive force output apparatus 82 and the brake apparatus 83 so that the own vehicle speed becomes the setting vehicle speed.

Here, a case where a preceding vehicle that satisfies the tracking target condition cannot be recognized on the basis of the forward information includes a case where a preceding vehicle itself does not exist ahead of the own vehicle and within a range that can be recognized by the external recognition apparatus 24, and a case where although a preceding vehicle exists ahead of the own vehicle and within a range that can be recognized by the external recognition apparatus 24, the preceding vehicle does not satisfy the tracking target condition. Further, the tracking target condition in the present embodiment is, for example, that a distance between vehicles with respect to a preceding vehicle is less than a predetermined setting distance, and vehicle speed of a preceding vehicle does not constantly exceed the setting vehicle speed. In other words, even in a case where a preceding vehicle exists within a range that can be recognized by the external recognition apparatus 24, in a case where the preceding vehicle is separated from the own vehicle by a distance equal to or greater than the setting distance or in a case where the preceding vehicle is constantly traveling at speed equal to or higher than the setting vehicle speed, the automatic traveling controller 61 does not set the preceding vehicle as the tracking target. Further, in a case where the tracking target is separated from the own vehicle by a distance equal to or greater than the setting distance or in a case where the vehicle speed of the tracking target constantly exceeds the setting vehicle speed while tracking control is executed with respect to the tracking target, the automatic traveling controller 61 cancels tracking control that is being executed. Thus, while the automatic traveling controller 61 is executing tracking control under the normal tracking mode to track the tracking target, the own vehicle speed does not constantly exceed the setting vehicle speed.

Further, as described above, while the automatic traveling controller 61 is executing automatic vehicle speed control under the normal tracking mode, the automatic traveling controller 61 automatically controls the own vehicle speed while setting the setting vehicle speed as target vehicle speed. Thus, also while the automatic vehicle speed control is being executed, the own vehicle speed does not constantly exceed the setting vehicle speed. Thus, while the automatic traveling controller 61 is executing the automatic traveling control, the own vehicle speed neither constantly exceeds the setting vehicle speed nor the own vehicle speed exceeds the setting vehicle speed when the own vehicle automatically accelerates.

<First Platooning Mode>

Figure 2:
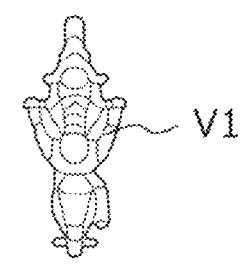
FIG. 2 is a view illustrating an example of a platoon in a zigzag pattern formed during traveling in a zigzag manner by a group including a plurality of motorcycles.
Figure 2:
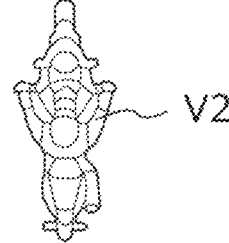
Figure 2:
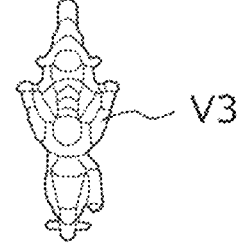
Figure 2:
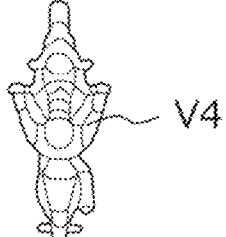

The first platooning mode is a control mode prepared for performing tracking control on the basis of two preceding vehicles that are close to the own vehicle, that is, two preceding vehicles traveling laterally ahead of and ahead of the own vehicle in a case where the own vehicle joins in platooning as the third or subsequent vehicle from a lead vehicle V1 (in the example of FIG. 2, a third motorcycle V3 from the lead vehicle or a fourth motorcycle V4) for traveling in a zigzag manner by a group including a plurality of (in the example of FIG. 2, four) motorcycles V1, V2, V3, V4, . . . as illustrated in FIG. 2. Here, in the example in FIG. 2, in a case where the own vehicle is the third motorcycle V3, and in a case where the control mode is set at the first platooning mode, the automatic traveling controller 61 performs tracking control on the basis of the second motorcycle V2 traveling laterally ahead of the own vehicle and the lead vehicle V1 traveling ahead of the own vehicle. Further, in a case where the own vehicle is the fourth motorcycle V4, and in a case where the control mode is set at the first platooning mode, the automatic traveling controller 61 performs tracking control on the basis of the third motorcycle V3 traveling laterally ahead of the own vehicle and the second motorcycle V2 traveling ahead of the own vehicle.

Note that hereinafter, in a platoon of saddle type vehicles formed in a zigzag pattern as illustrated in FIG. 2, a preceding vehicle traveling in front of the own vehicle (that is, at a position at which courses overlap) among preceding vehicles traveling ahead of the own vehicle will be referred to as a front preceding vehicle, and a preceding vehicle traveling at a position offset to right or left with respect to the course of the own vehicle along a vehicle width direction will be also referred to as an offset preceding vehicle. In other words, in the example in FIG. 2, in a case where the own vehicle is the motorcycle V3, the motorcycle V1 is a front preceding vehicle, and the motorcycle V2 is an offset preceding vehicle. Further, among subsequent vehicles traveling behind the own vehicle, a subsequent vehicle traveling on a rear side of the own vehicle (that is, at a position at which courses overlap) will be referred to as a rear side subsequent vehicle, and a subsequent vehicle traveling at a position offset to right or left with respect to the course of the own vehicle along the vehicle width direction will be also referred to as an offset subsequent vehicle. In other words, in the example in FIG. 2, in a case where the own vehicle is the motorcycle V2, the motorcycle V4 is a rear side subsequent vehicle, and the motorcycle V3 is an offset subsequent vehicle.

Figure 3A:
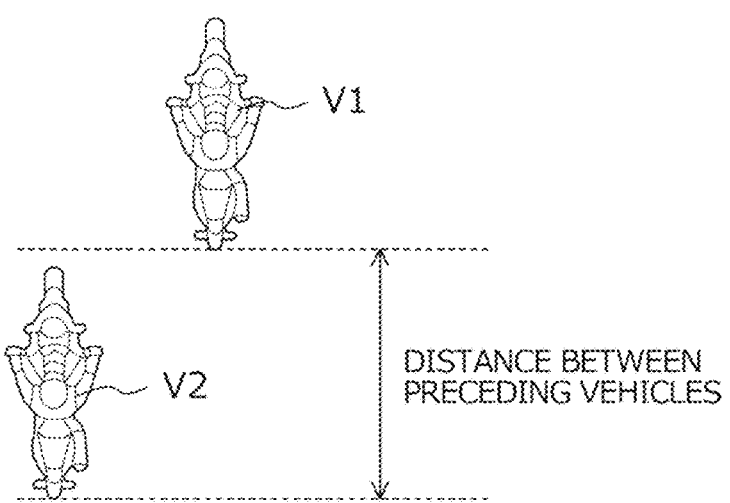
FIG. 3A is a view for explaining specific procedure of tracking control under a first platooning mode (upon cruising traveling)
Figure 3A:
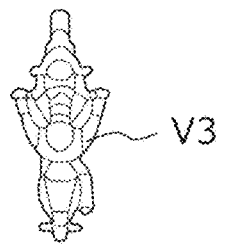
Figure 3B:
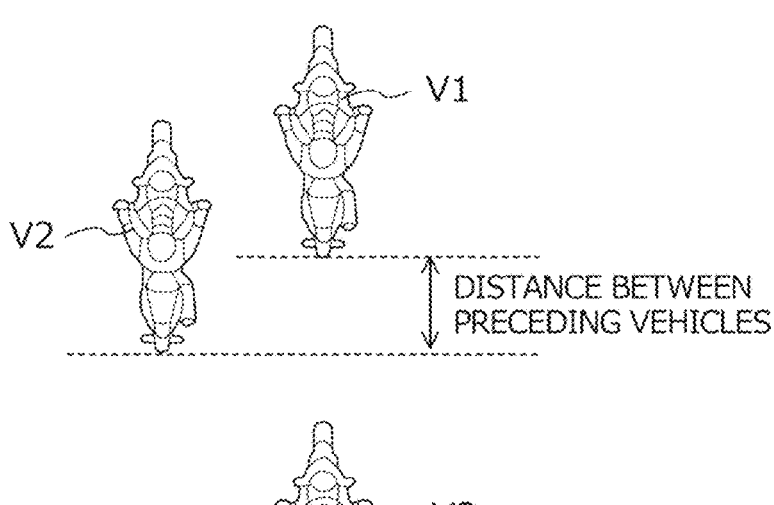
FIG. 3B is a view for explaining specific procedure of tracking control under the first platooning mode (upon deceleration)

Specific procedure of tracking control under the first platooning mode will be described below with reference to FIG. 3A and FIG. 3B. Note that a case will be described below where the own vehicle is the third motorcycle V3 from the lead vehicle V1 in a case where a group including three motorcycles V1, V2 and V3 travels in a zigzag manner as illustrated in FIG. 3A and FIG. 3B. In other words, a case will be described below where a total of two preceding vehicles of the offset preceding vehicle V2 traveling laterally ahead of the own vehicle and the front preceding vehicle V1 traveling ahead of the offset preceding vehicle V2 along a traveling direction and traveling at a closer position than the offset preceding vehicle V2 along the vehicle width direction are recognized on the basis of the forward information acquired at the motorcycle V3 that is the own vehicle.

FIG. 3A illustrates a case where the platoon performs cruising traveling, that is, a case where the whole platoon moves at substantially fixed cruising speed, and as a result, a distance between preceding vehicles that is a distance between the two preceding vehicles V1 and V2 ahead of the own vehicle along the traveling direction (for example, a distance between rear end portions of the two preceding vehicles along the traveling direction) is equal to or greater than a predetermined distance threshold. Upon cruising traveling as illustrated in FIG. 3A, the automatic traveling controller 61 sets the offset preceding vehicle V2 traveling laterally ahead of the own vehicle among the two preceding vehicles V1 and V2 as the tracking target, and performs tracking control with respect to the tracking target through the same procedure as the procedure in the normal tracking mode, thereby causes the own vehicle to track the tracking target while keeping a distance between the offset preceding vehicle V2 and the own vehicle (for example, a distance between the rear end portion of the tracking target and a front end portion of the own vehicle along the traveling direction).

FIG. 3B illustrates a case where upon deceleration of the platoon, that is, as a result of the lead front preceding vehicle V1 decelerating for some reason, and the offset preceding vehicle V2 that tracks the front preceding vehicle V1 decelerating, a distance between the two preceding vehicles V1 and V2 ahead of the own vehicle is less than the above-described distance threshold. Upon deceleration as illustrated in FIG. 3B, the automatic traveling controller 61 sets the front preceding vehicle V1 traveling ahead of the own vehicle among the two preceding vehicles V1 and V2 as the tracking target, and performs tracking control with respect to the tracking target through the same procedure as the procedure in the normal tracking mode, thereby causes the own vehicle to track the tracking target while keeping a distance between the front preceding vehicle V1 traveling ahead of the own vehicle and the own vehicle.

As described above, in a case where the control mode is set at the first platooning mode, the automatic traveling controller 61 performs tracking control on the basis of a distance between two preceding vehicles traveling laterally ahead of and ahead of the own vehicle while automatically switching the tracking target between the two preceding vehicles, thereby supports driving operation for keeping a platoon by a rider of the own vehicle that joins in the platoon as the third or subsequent vehicle.

<Second Platooning Mode>

The second platooning mode is a control mode prepared for performing tracking control on the basis of the offset preceding vehicle and the offset subsequent vehicle that are close to the own vehicle in a case where the own vehicle joins in platooning as the second vehicle from the lead vehicle V1 (in the example in FIG. 2, the second motorcycle V2 from the lead vehicle) for traveling in a zigzag manner by a group including a plurality of motorcycles V1, V2, V3, V4, . . . as illustrated in FIG. 2. Here, in the example in FIG. 2, in a case where the own vehicle is the second motorcycle V2, and in a case where the control mode is set at the second platooning mode, the automatic traveling controller 61 performs tracking control on the basis of the offset preceding vehicle V1 traveling laterally ahead of the own vehicle and the offset subsequent vehicle V3 traveling laterally behind the own vehicle.

Figure 4A:
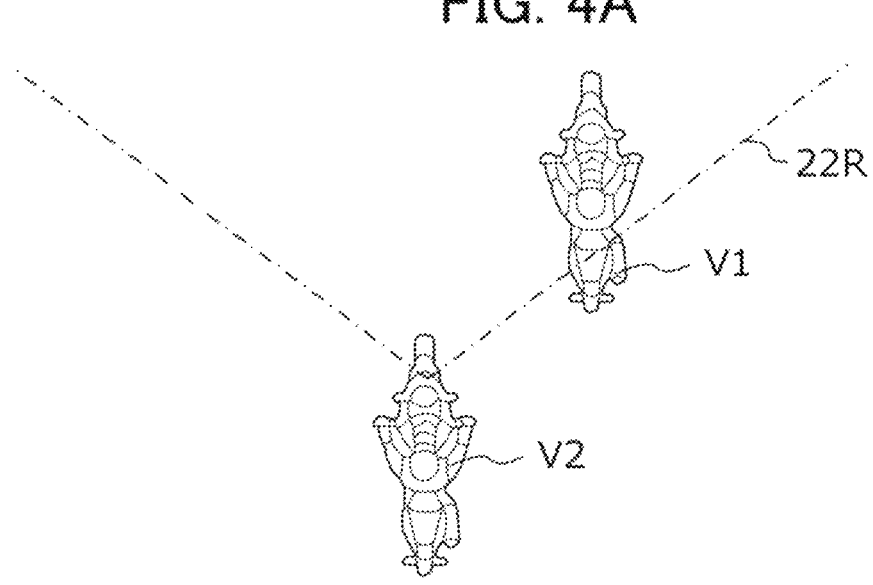
FIG. 4A is a view for explaining specific procedure of tracking control under a second platooning mode (upon cruising traveling)
Figure 4A:
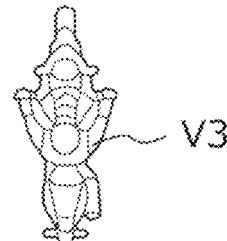
Figure 4B:
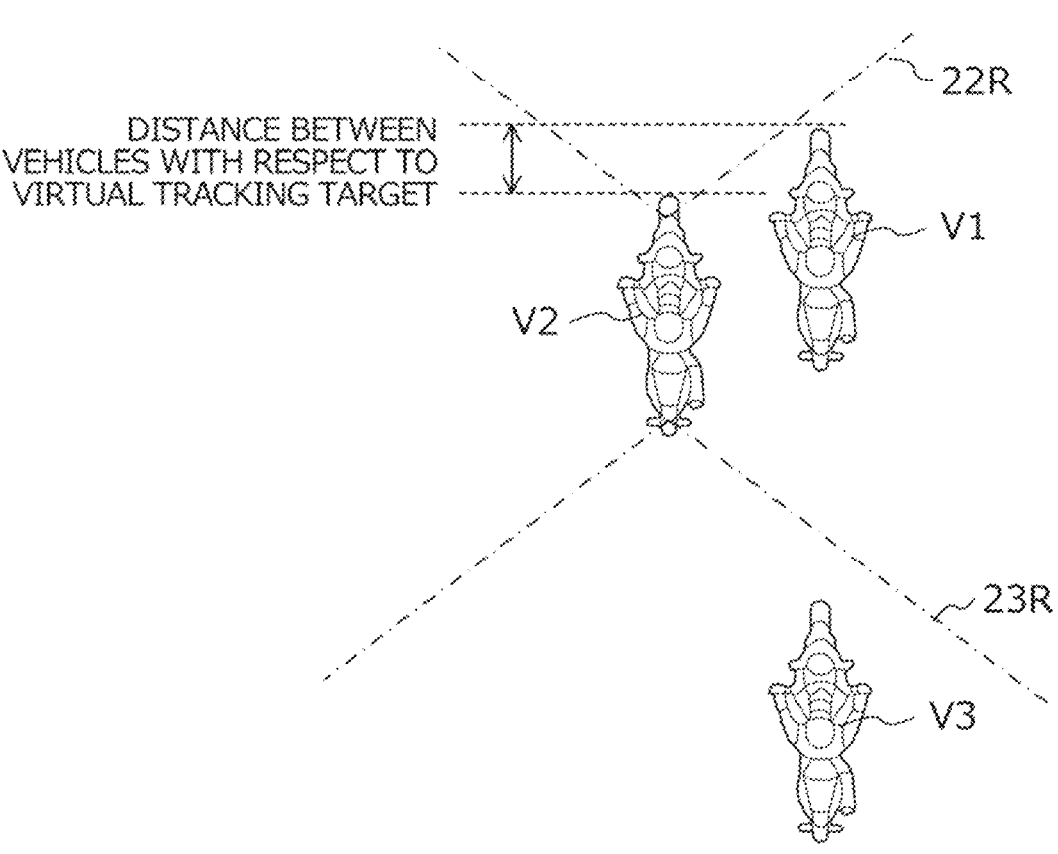
FIG. 4B is a view for explaining specific procedure of tracking control under the second platooning mode (upon deceleration)

Specific procedure of tracking control under the second platooning mode will be described below with reference to FIG. 4A and FIG. 4B. Note that a case will be described below where the own vehicle is the second motorcycle V2 from the lead vehicle V1 in a case where a group including three motorcycles V1, V2 and V3 travels in a zigzag manner as illustrated in FIG. 4A and FIG. 4B. In other words, a case will be described below where a total of two preceding vehicle and subsequent vehicle, that is, the offset preceding vehicle V1 traveling laterally ahead of the own vehicle and the offset subsequent vehicle V3 traveling laterally behind the own vehicle are recognized on the basis of the forward information and rearward information acquired at the motorcycle V2 that is the own vehicle.

FIG. 4A illustrates a case where the platoon performs cruising traveling, that is, a case where the whole platoon moves at substantially fixed cruising speed, and as a result, the offset preceding vehicle V1 laterally ahead of the own vehicle exists within a detection range 22R of the forward radar unit of the own vehicle. During cruising traveling as illustrated in FIG. 4A, the automatic traveling controller 61 sets the offset preceding vehicle V1 traveling laterally ahead of the own vehicle as a tracking target and performs tracking control through the same procedure as the procedure in the normal tracking mode with respect to the tracking target, thereby causes the own vehicle to track the tracking target while keeping a distance between the offset preceding vehicle V1 and the own vehicle (more specifically, a distance between a rear end portion of the tracking target and a front end portion of the own vehicle along the traveling direction).

FIG. 4B illustrates a case of deceleration of the platoon, that is, a case where, as a result of the lead offset preceding vehicle V1 decelerating for some reason, the offset preceding vehicle V1 that is set as the tracking target so far goes out of the detection range 22R of the forward radar unit of the own vehicle. In this case, the automatic traveling controller 61 cannot grasp a position of the offset preceding vehicle V1 on the basis of the forward information, and thus, it becomes difficult to perform tracking control while setting this offset preceding vehicle V1 as the tracking target.

On the other hand, if the offset preceding vehicle V1 decelerates as illustrated in FIG. 4B, it can be considered that the offset subsequent vehicle V3 traveling laterally behind the own vehicle decelerates to secure a certain amount of distance between vehicles with respect to the offset preceding vehicle V1 traveling on the course. Thus, the position of the offset preceding vehicle V1 can be estimated to some extent on the basis of a position of a front end portion of the offset subsequent vehicle V3 traveling laterally behind the own vehicle. Thus, the automatic traveling controller 61 acquires the position of the front end portion of the offset subsequent vehicle V3 traveling laterally behind the own vehicle within a detection range 23R of the rearward radar unit of the own vehicle on the basis of the rearward information during deceleration as illustrated in FIG. 4B, and further estimates the position of the front end portion of the offset preceding vehicle V1 traveling laterally ahead of the own vehicle on the basis of the position of the front end portion of the offset subsequent vehicle V3. Further, the automatic traveling controller 61 sets a virtual offset preceding vehicle V1 determined on the basis of the estimation result as the tracking target and continues tracking control with respect to the tracking target. Here, in a case where the automatic traveling controller 61 performs tracking control while setting the virtual offset preceding vehicle V1 as the tracking target, a distance between the virtual tracking target and the own vehicle is defined with a distance between the front end portion of the virtual tracking target and the front end portion of the own vehicle along the traveling direction.

As described above, in a case where the control mode is set at the second platooning mode, the automatic traveling controller 61 recognizes the offset preceding vehicle traveling laterally ahead of the own vehicle on the basis of the forward information and the rearward information and performs tracking control while setting the offset preceding vehicle as the tracking target, thereby supports driving operation for keeping a platoon by the rider of the own vehicle that joins in the platoon as the second vehicle.

Returning to FIG. 1, the inter-vehicle distance setter 63 sets a target distance between vehicles in tracking control by the automatic traveling controller 61 in a case where the ACC function is in an ON state. More specifically, the inter-vehicle distance setter 63 sets a target distance between vehicles on the basis of the forward information acquired by the external recognition apparatus 24 and the detection result by the vehicle sensor unit 3. More specifically, the inter-vehicle distance setter 63 calculates vehicle speed of the tracking target and an actual distance between the own vehicle and the tracking target on the basis of the forward information and sets a target distance between vehicles so as to become longer as the vehicle speed of the tracking target becomes higher. The inter-vehicle distance setter 63 transmits information regarding the set target distance between vehicles to the automatic traveling controller 61.

Note that as described with reference to FIG. 4B, while tracking control is performed under the second platooning mode, if the tracking target decelerates and goes out of the detection range 22R of the forward radar unit, there is a case where the tracking target cannot be continuously recognized only with the forward information. In this case, the inter-vehicle distance setter 63 preferably estimates the position of the tracking target traveling side by side with the own vehicle on the basis of the rearward information as described above and further sets the actual distance between vehicles and the target distance between vehicles on the basis of the estimation result.

The vehicle speed setter 64 sets the setting vehicle speed in the automatic traveling control by the automatic traveling controller 61 in a case where the ACC function is in an ON state and transmits information regarding the set setting vehicle speed to the automatic traveling controller 61 and the display controller 65.

Here, the vehicle speed setter 64 can set or change the setting vehicle speed on the basis of operation of the HMI 4 (particularly, the ACC lever 44) by the rider. More specifically, in a case where it is detected that the ACC lever 44 is tilted to the "SET/–" side when the control mode is the standby mode, the vehicle speed setter 64 sets the own vehicle speed at that time as the setting vehicle speed. In a case where it is detected that the ACC lever 44 is tilted to the "RES/+" side when the control mode is the standby mode, the vehicle speed setter 64 sets a value stored in the memory as the setting vehicle speed. In a case where it is detected that the ACC lever 44 is tilted to the "RES/+" side when the control mode is set at the normal tracking mode, the first platooning mode and the second platooning mode, and the own vehicle speed is equal to or higher than predetermined speed, the vehicle speed setter 64 changes the setting vehicle speed to increase by each unit speed. Further, in a case where it is detected that the ACC lever 44 is tilted to the "SET/–" side when the control mode is set at the normal tracking mode, the first platooning mode and the second platooning mode, and the own vehicle speed is equal to or higher than predetermined speed, the vehicle speed setter 64 changes the setting vehicle speed to decrease by each unit speed. Thus, the rider can newly set or change the setting vehicle speed by operating the ACC lever 44.

Further, in a case where tracking control is performed under the first platooning mode and the second platooning mode, the vehicle speed setter 64 automatically sets speed obtained by adding a predetermined value (for example, 10 km/h) to the own vehicle speed at the time of start of the tracking control as the setting vehicle speed.

The display controller 65 presents various kinds of information to the rider who is driving by causing an image generated in accordance with commands from the automatic traveling controller 61, the vehicle speed setter 64 and the control mode setter 62 which will be described later, and the like, to be displayed at the display 41. Note that a specific example of the image to be displayed at the display 41 under control by the display controller 65 will be described later with reference to FIG. 6 to FIG. 12B.

The control mode setter 62 sets the control mode of the automatic traveling control by the automatic traveling controller 61 on the basis of the forward information and the rearward information transmitted from the external recognition apparatus 24, and signals transmitted from the ACC main switch 43, the ACC lever 44, the setting button 45, the accelerator position sensor 812, the brake lever switch 814, the brake pedal switch 816, and the like.

Figure 5:
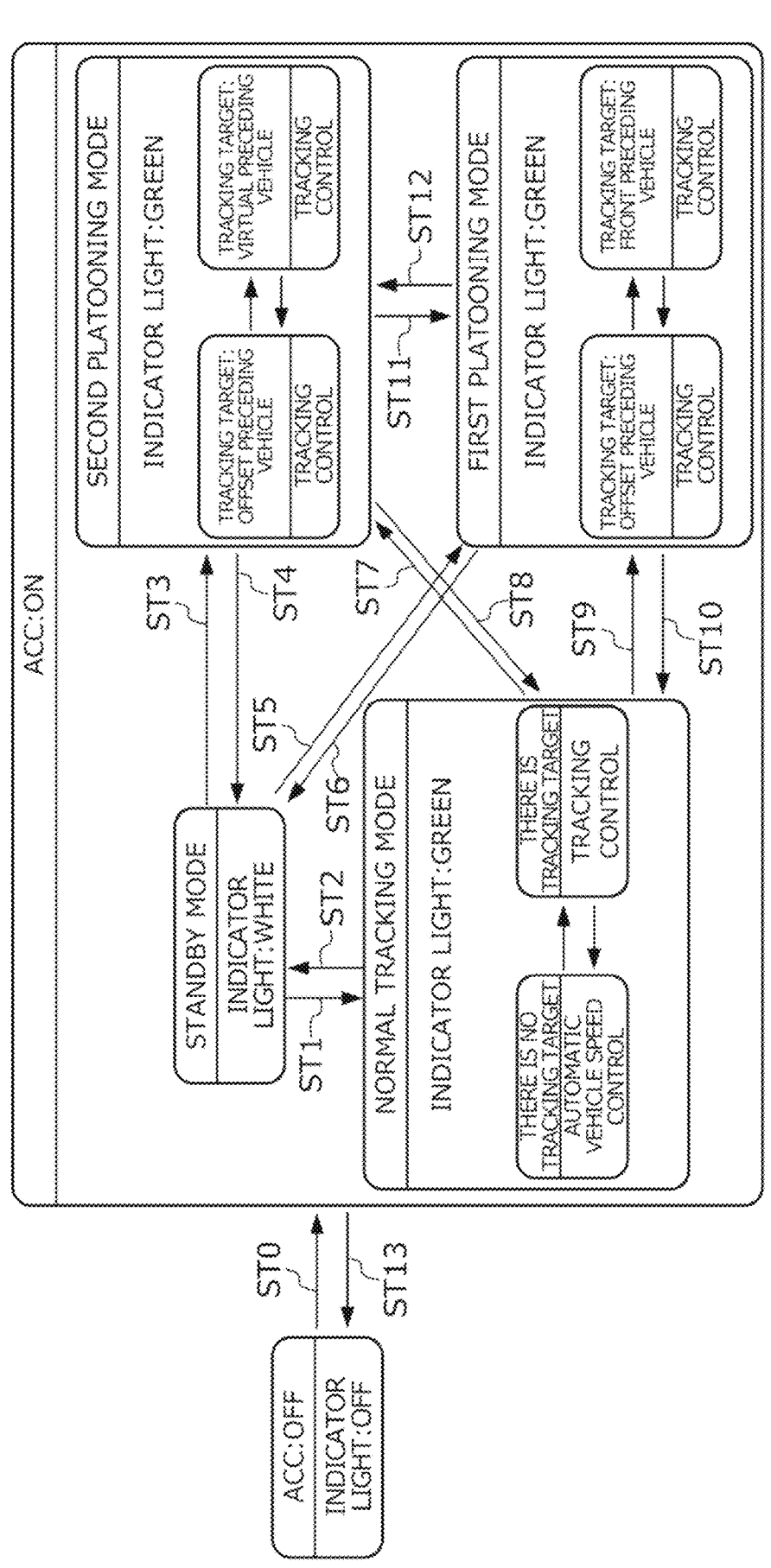
FIG. 5 is a transition diagram of a control mode.

FIG. 5 is a transition diagram of the control mode. The control mode setter 62 turns ON/OFF the ACC function in the automatic traveling controller 61 or causes the control mode to transition in accordance with the transition diagram as illustrated in FIG. 5.

In FIG. 5, as indicated with a step number "ST0", if the ACC main switch 43 is depressed in a state where an ignition switch (not illustrated) is turned ON, the control mode setter 62 switches the state of the ACC function of the automatic traveling controller 61 from an OFF state to an ON state and sets the control mode at the standby mode. Further, the control mode setter 62 lights the ACC function indicator light 42 in white in a state where the control mode is set at the standby mode.

Figure 6:
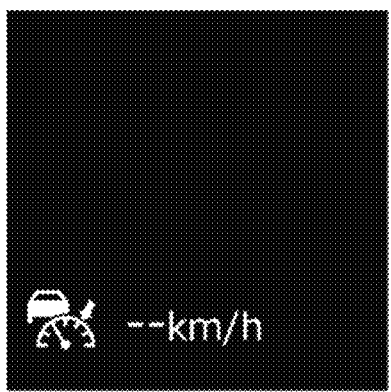
FIG. 6 is a view illustrating an example of an image to be displayed during a standby mode.

Still further, in a state where the control mode is set at the standby mode, the control mode setter 62 transmits a command to the display controller 65 and causes an image as illustrated in FIG. 6 to be displayed at the display 41. Note that FIG. 6 illustrates an example of an image to be displayed when the setting vehicle speed is not set yet.

In FIG. 5, as indicated with a step number "ST13", if the ACC main switch 43 is depressed when the ACC function of the automatic traveling controller 61 is in an ON state, the control mode setter 62 puts the ACC function of the automatic traveling controller 61 into an OFF state. Further, when the ACC function is in an OFF state, the control mode setter 62 turns off the ACC function indicator light 42.

In FIG. 5, as indicated with a step number "ST1", if the ACC lever 44 is tilted to the "RES/+" side or the "SET/–" side in a state where the control mode is set at the standby mode, the control mode setter 62 sets the control mode at the normal tracking mode. The control mode setter 62 lights the ACC function indicator light 42 in green in a state where the control mode is set at the normal tracking mode.

In a state where the control mode is set at the normal tracking mode, in a case where a preceding vehicle that satisfies the tracking target condition can be recognized on the basis of the forward information as described above, the automatic traveling controller 61 performs tracking control while setting the preceding vehicle as the tracking target, and in a case where a preceding vehicle that satisfies the tracking target condition cannot be recognized on the basis of the forward information, the automatic traveling controller 61 does not set the tracking target and executes automatic vehicle speed control under the setting vehicle speed. In this event, the automatic traveling controller 61 automatically switches control between tracking control and automatic vehicle speed control on the basis of the forward information.

Figure 7A:
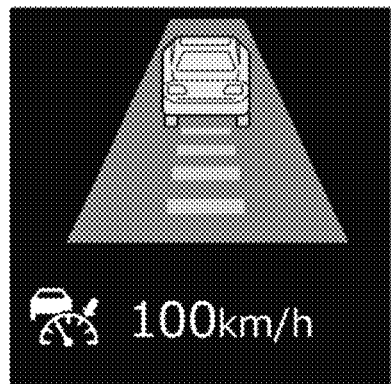
FIG. 7A is a view illustrating an example of an image to be displayed when a normal tracking mode is set (during execution of tracking control)
Figure 7B:
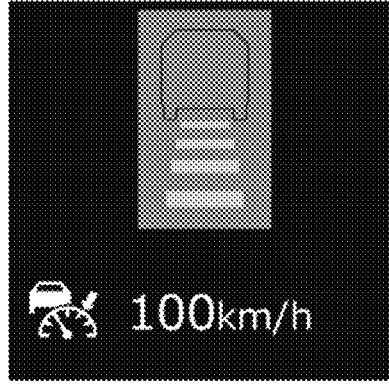
FIG. 7B is a view illustrating an example of an image to be displayed when the normal tracking mode is set (during execution of automatic vehicle speed control)

In a state where the control mode is set at the normal tracking mode, and tracking control is being executed, the control mode setter 62 transmits a command to the display controller 65 to cause an image as illustrated in FIG. 7A to be displayed at the display 41. Further, in a state where the control mode is set at the normal tracking mode, and automatic vehicle speed control is being executed, the control mode setter 62 transmits a command to the display controller 65 to cause an image as illustrated in FIG. 7B to be displayed at the display 41. Note that FIG. 7A and FIG. 7B illustrate examples of images to be displayed when the setting vehicle speed is 100 [km/h].

In FIG. 5, as indicated with a step number "ST2", in a case where a temporary cancel condition is met (the brake lever or the brake pedal is operated or the accelerator grip is operated to a negative position side) in a state where the control mode is set at the normal tracking mode, the control mode setter 62 sets the control mode at the standby mode.

In FIG. 5, as indicated with a step number "ST3", if second mode approval operation or second mode setting operation which will be described later on the setting button is accepted in a state where the control mode is set at the standby mode, the control mode setter 62 sets the control mode at the second platooning mode. Further, the control mode setter 62 lights the ACC function indicator light 42 in green in a state where the control mode is set at the second platooning mode.

Figure 8:
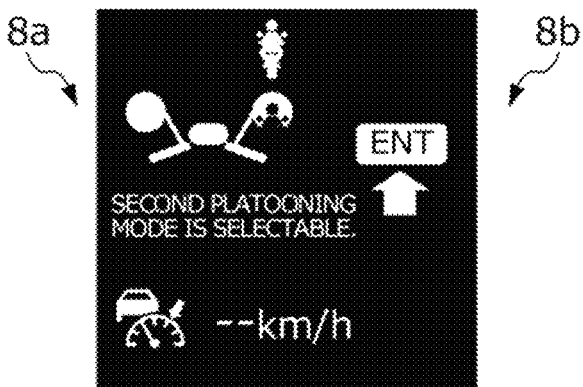
FIG. 8 is a view illustrating an example of an image to be displayed when the second platooning mode is proposed.

Here, the second mode approval operation refers to operation to be performed by the rider on the setting button (for example, operation of depressing an enter button) when the rider approves a proposal to transition to the second platooning mode by the control mode setter 62. More specifically, while the control mode is set at the standby mode or the normal tracking mode, in a case where an offset preceding vehicle and an offset subsequent vehicle that satisfy two second platooning conditions (1a) to (2a) which will be described below are recognized on the basis of the forward information (that is, in a case where the state becomes a state where tracking control can be executed under the second platooning mode), the control mode setter 62 transmits a command to the display controller 65 to cause an image as illustrated in FIG. 8, that is, an image 8a indicating that tracking control can be executed under the second platooning mode and an image 8b indicating procedure of specific approval operation (for example, operation of depressing the enter button) to be displayed at the display 41. In a case where approval operation by the rider is accepted while a proposal image to the rider as illustrated in FIG. 8 is displayed, the control mode setter 62 immediately sets the control mode at the second platooning mode.

The second platooning condition (1a): an offset preceding vehicle for which a difference in speed from the own vehicle speed is less than predetermined speed exists laterally ahead of the own vehicle within a range of a predetermined distance from the own vehicle. The second platooning condition (2a): an offset subsequent vehicle for which a difference in speed from the own vehicle speed is less than predetermined speed exists laterally behind of the own vehicle and behind the above-described offset preceding vehicle within a range of a predetermined distance from the own vehicle.

Figure 9:
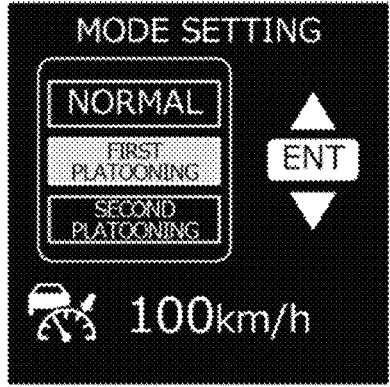
FIG. 9 is a view illustrating an example of a mode setting image.

Further, the second mode setting operation refers to a series of operations (that is, setting screen call operation, selection operation and determination operation which will be described later) to be spontaneously performed by the rider on the setting button 45 for causing the control mode to transition to the second platooning mode before the offset preceding vehicle and the offset subsequent vehicle that satisfy the above-described second platooning conditions (1a) to (2a) are recognized on the basis of the forward information and the rearward information. More specifically, if the rider performs predetermined setting screen call operation (for example, operation of depressing a cursor button) on the setting button 45 while the control mode is set at the standby mode, the normal tracking mode or the first platooning mode, the control mode setter 62 transmits a command to the display controller 65 to cause a mode setting image as illustrated in FIG. 9 to be displayed at the display 41. As illustrated in FIG. 9, the mode setting image includes an image 9a displaying names of three control modes (the normal tracking mode, the first platooning mode and the second platooning mode) that can be selected by the rider, and an image 9b indicating procedure of specific selection operation (for example, operation of depressing an upper cursor button or a lower cursor button) and determination operation (for example, operation of depressing the enter button). Note that the example illustrated in FIG. 9 illustrates a state where the first platooning mode is selected by the rider. In a case where the second platooning mode is selected by the rider, and determination operation is accepted while the mode setting image as illustrated in FIG.

9 is displayed, the control mode setter 62 sets the control mode at the second platooning mode after the offset preceding vehicle and the offset subsequent vehicle that satisfy the above-described second platooning conditions (1a) and (2a) are recognized on the basis of the forward information and the rearward information.

In a state where the control mode is set at the second platooning mode, and in a case where an offset preceding vehicle can be recognized on the basis of the forward information as described above, the automatic traveling controller 61 performs tracking control while setting this offset preceding vehicle as the tracking target and in a case where this offset preceding vehicle cannot be recognized as a result of the offset preceding vehicle decelerating, the automatic traveling controller 61 performs tracking control while setting a virtual offset preceding vehicle estimated on the basis of the rearward information as the tracking target. In this event, the automatic traveling controller 61 automatically switches the tracking target on the basis of the forward information and the rearward information.

Figure 10A:
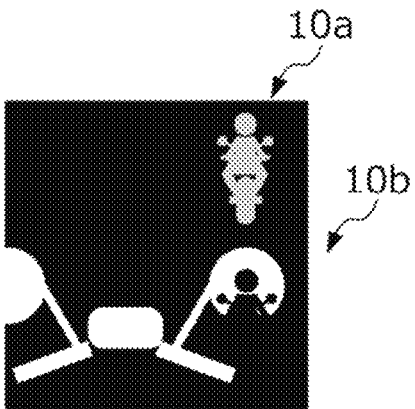
FIG. 10A is a view illustrating an example of an image to be displayed when the second platooning mode is set (in a case where an offset preceding vehicle is set as a tracking target)
Figure 10B:
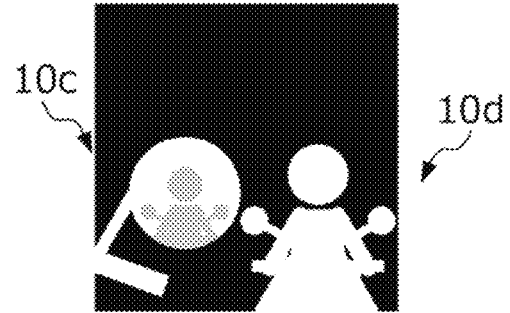
FIG. 10B is a view illustrating an example of an image to be displayed when the second platooning mode is set (in a case where a virtual offset preceding vehicle is set as the tracking target)

While tracking control is performed while the offset preceding vehicle is set as the tracking target under the second platooning mode, the automatic traveling controller 61 transmits a command to the display controller 65 to cause an image including an image 10a indicating the offset preceding vehicle colored in green and an image 10b indicating the offset subsequent vehicle in a mirror of the own vehicle to be displayed at the display 41 as illustrated in FIG. 10A. Further, while tracking control is performed while the virtual offset preceding vehicle is set as the tracking target under the second platooning mode, the automatic traveling controller 61 transmits a command to the display controller 65 to cause an image including an image 10c indicating the offset subsequent vehicle colored in green and in the mirror of the own vehicle appearing larger than that in FIG. 10A and an image 10d indicating the offset preceding vehicle larger than that in FIG. 10A on a lateral side of the own vehicle to be displayed at the display 41 as illustrated in FIG. 10B. This enables the rider to visually and easily grasp a current control state.

In FIG. 5, as indicated with a step number "ST4", in a case where operation indicated with the step number "ST2" is performed or one of six second platooning cancel conditions (1b) to (6b) which will be described later is satisfied in a state where the control mode is set at the second platooning mode, the control mode setter 62 cancels tracking control under the second platooning mode and sets the control mode at the standby mode.

The second platooning cancel condition (1b): a distance between the offset preceding vehicle that is the tracking target and the own vehicle becomes equal to or greater than a predetermined distance. The second platooning cancel condition (2b): deceleration of the offset preceding vehicle that is the tracking target cannot be detected, and the offset preceding vehicle cannot be recognized on the basis of the forward information. The second platooning cancel condition (3b): vehicle speed of the offset preceding vehicle that is the tracking target constantly exceeds the setting vehicle speed. The second platooning cancel condition (4b): a state where a distance between the offset subsequent vehicle and the own vehicle is equal to or greater than the predetermined distance continues for a predetermined period. The second platooning cancel condition (5b): the offset subsequent vehicle passes the own vehicle. The second platooning cancel condition (6b): a state where the offset subsequent vehicle is close to the own vehicle continues for a predetermined period.

In FIG. 5, as indicated with a step number "ST5", if first mode approval operation or first mode setting operation which will be described later on the setting button 45 is accepted in a state where the control mode is set at the standby mode, the control mode setter 62 sets the control mode at the first platooning mode. Further, the control mode setter 62 lights the ACC function indicator light 42 in green in a state where the control mode is set at the first platooning mode.

Figure 11:
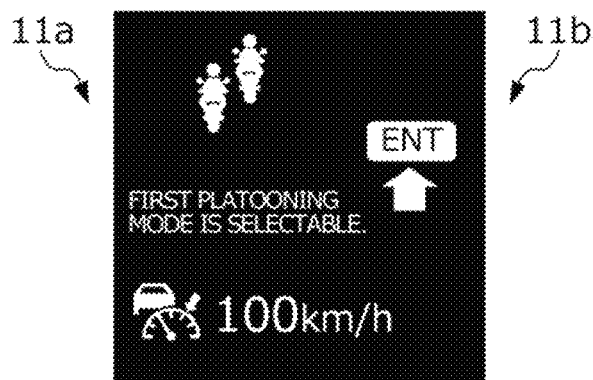
FIG. 11 is a view illustrating an example of an image to be displayed when the first platooning mode is proposed.

Here, the first mode approval operation refers to operation to be performed by the rider on the setting button (for example, operation of depressing the enter button) when the rider approves a proposal to transition to the first platooning mode by the control mode setter 62. More specifically, in a case where an offset preceding vehicle and a front preceding vehicle that satisfy three first platooning conditions (1*c*) to (3*c*) which will be described later are recognized on the basis of the forward information (that is, in a case where the state becomes a state where tracking control can be executed under the second platooning mode) while the control mode is set at the standby mode or the normal tracking mode, the control mode setter 62 transmits a command to the display controller 65 to cause an image as illustrated in FIG. 11, that is, an image 11*a* indicating that tracking control can be executed under the first platooning mode and an image 11*b* indicating procedure of specific approval operation (for example, operation of depressing the enter button) to be displayed at the display 41. In a case where approval operation by the rider is accepted while a proposal image to the rider as illustrated in FIG. 11 is displayed, the control mode setter 62 immediately sets the control mode at the first platooning mode.

The first platooning condition (1*c*): an offset preceding vehicle for which a difference in speed from the own vehicle speed is less than predetermined speed exists within a range of a predetermined distance from the own vehicle. The first platooning condition (2*c*): a front preceding vehicle for which a difference in speed from the own vehicle speed is less than predetermined speed exists within a range of a predetermined distance from the own vehicle. The first platooning condition (3*c*): a distance between preceding vehicles that is a distance between the offset preceding vehicle and the front preceding vehicle is less than a predetermined distance.

Further, the first mode setting operation refers to a series of operations (that is, setting screen call operation, selection operation and determination operation which will be described later) to be spontaneously performed by the rider on the setting button 45 to cause the control mode to transition to the first platooning mode before the offset preceding vehicle and the front preceding vehicle that satisfy the above-described first platooning conditions (1*c*) to (2*c*) are recognized on the basis of the forward information. More specifically, if the rider performs predetermined setting screen call operation (for example, operation of depressing the cursor button) on the setting button 45 while the control mode is set at the standby mode, the normal tracking mode or the second platooning mode, the control mode setter 62 transmits a command to the display controller 65 to cause the mode setting screen as illustrated in FIG. 9 to be displayed at the display 41. In a case where the first platooning mode is selected by the rider, and determination operation is accepted while the mode setting image as illustrated in FIG. 9 is displayed, the control mode setter 62 sets the control mode at the first platooning mode after the offset preceding vehicle and the front preceding vehicle that satisfy the above-described first platooning conditions (1*c*) to (3*c*) are recognized on the basis of the forward information.

In a state where the control mode is set at the first platooning mode, in a case where a distance between preceding vehicles that is a distance between the offset preceding vehicle and the front preceding vehicle is equal to or greater than a predetermined distance threshold as described above, the automatic traveling controller 61 performs tracking control while setting the offset preceding vehicle as the tracking target, and in a case where the distance between the offset preceding vehicle and the front preceding vehicle is less than the above-described distance threshold, the automatic traveling controller 61 performs tracking control while setting the front preceding vehicle as the tracking target. In this event, the automatic traveling controller 61 automatically switches the tracking target on the basis of the forward information.

Figure 12A:
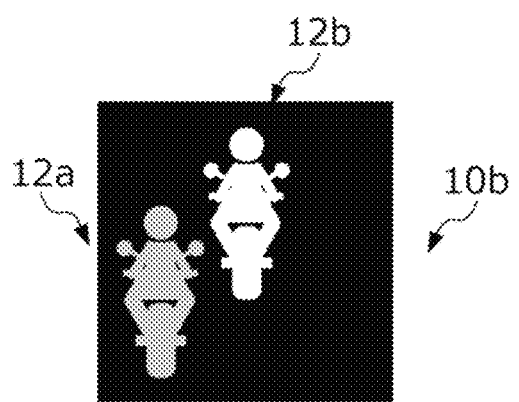
FIG. 12A is a view illustrating an example of an image to be displayed when the first platooning mode is set (in a case where the offset preceding vehicle is set as the tracking target)
Figure 12B:
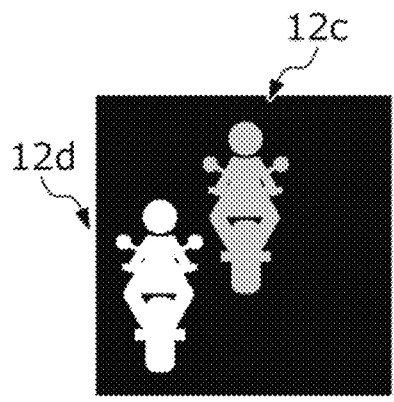
FIG. 12B is a view illustrating an example of an image to be displayed when the first platooning mode is set (in a case where a front preceding vehicle is set as the tracking target)

While tracking control is performed while the offset preceding vehicle is set as the tracking target under the first platooning mode, the automatic traveling controller 61 transmits a command to the display controller 65 to cause an image including an image 12*a* indicating the offset preceding vehicle colored in green and an image 12*b* indicating the front preceding vehicle colored in white to be displayed at the display 41 as illustrated in FIG. 12A. Further, while tracking control is performed while the front preceding vehicle is set as the tracking target under the first platooning mode, the automatic traveling controller 61 transmits a command to the display controller 65 to cause an image including an image 12*c* indicating the front preceding vehicle colored in green and an image 12*d* indicating the offset preceding vehicle colored in white to be displayed at the display 41 as illustrated in FIG. 12B. This enables the rider to visually and easily grasp a current control state.

In FIG. 5, as indicated with a step number "ST6", in a case where operation indicating in the step number "ST2" is performed or one of six first platooning cancel conditions (1*d*) to (6*d*) is satisfied in a state where the control mode is set at the first platooning mode, the control mode setter 62 cancels tracking control under the first platooning mode and sets the control mode at the standby mode.

The first platooning cancel condition (1*d*): a distance between the offset preceding vehicle or the front preceding vehicle and the own vehicle is equal to or greater than a predetermined distance. The first platooning cancel condition (2*d*): the offset preceding vehicle or the front preceding vehicle cannot be recognized on the basis of the forward information. The first platooning cancel condition (3*d*): the offset preceding vehicle passes the front preceding vehicle. The first platooning cancel condition (4*d*): a state where the distance between preceding vehicles that is a distance between the offset preceding vehicle and the front preceding vehicle is less than a predetermined distance continues for a predetermined period. The first platooning cancel condition (5*d*): a state where the distance between preceding vehicles that is a distance between the offset preceding vehicle and the front preceding vehicle is equal to or greater than the predetermined distance continues for a predetermined period. The first platooning cancel condition (6*d*): the vehicle speed of the tracking target constantly exceeds the setting vehicle speed.

In FIG. 5, as indicated with a step number "ST7", if the above-described second mode approval operation or second mode setting operation on the setting button 45 is accepted in a state where the control mode is set at the normal tracking mode, the control mode setter 62 sets the control mode at the second platooning mode.

In FIG. 5, as indicated with a step number "ST8", if third mode setting operation which will be described later on the setting button 45 is accepted in a state where the control mode is set at the second platooning mode, the control mode setter 62 sets the control mode at the normal tracking mode.

Here, the third mode setting operation refers to a series of operations (that is, setting screen call operation, selection operation and determination operation which will be described below) to be spontaneously performed by the rider on the setting button 45 to cause the control mode to transition to the normal tracking mode when the rider of the own vehicle that performs platooning under the first or the second platooning mode leaves the platoon. More specifically, if the rider performs predetermined setting screen call operation (for example, operation of depressing the cursor button) on the setting button 45 while the control mode is set at the first platooning mode or the second platooning mode, the control mode setter 62 transmits a command to the display controller 65 to cause the mode setting screen as illustrated in FIG. 9 to be displayed at the display 41. In a case where the normal tracking mode is selected by the rider, and determination operation is accepted while the mode setting screen as illustrated in FIG. 9 is displayed, the control mode setter 62 takes over setting of the tracking target and sets the control mode at the normal tracking mode.

In FIG. 5, as indicated with a step number "ST9", if the above-described first mode approval operation or first mode setting operation on the setting button 45 is accepted in a state where the control mode is set at the normal tracking mode, the control mode setter 62 sets the control mode at the first platooning mode.

In FIG. 5, as indicated with a step number "ST10", if the above-described third mode setting operation on the setting button 45 is accepted in a state where the control mode is set at the first platooning mode, the control mode setter 62 sets the control mode at the normal tracking mode.

In FIG. 5, as indicated with a step number "step ST11", if the above-described first mode setting operation on the setting button 45 is accepted in a state where the control mode is set at the second platooning mode, the control mode setter 62 sets the control mode at the first platooning mode.

In FIG. 5, as indicated with a step number "ST12", if the above-described second mode setting operation on the setting button 45 is accepted in a state where the control mode is set at the first platooning mode, the control mode setter 62 sets the control mode at the second platooning mode.

FIG. 13 to FIG. 21B are flowcharts indicating specific procedure of the automatic traveling control by the driving support control apparatus 6. The processing indicated in FIG. 13 to FIG. 21B is repeatedly executed by the driving support control apparatus 6 with a predetermined control period after the ignition switch (not illustrated) is turned on and the driving support system 1 is started by the rider. Note that each step indicated in FIG. 13 to FIG. 21B is implemented by a computer program stored in a storage device (not illustrated) being executed by the driving support control apparatus 6 while the driving support system 1 is started.

Figure 13:
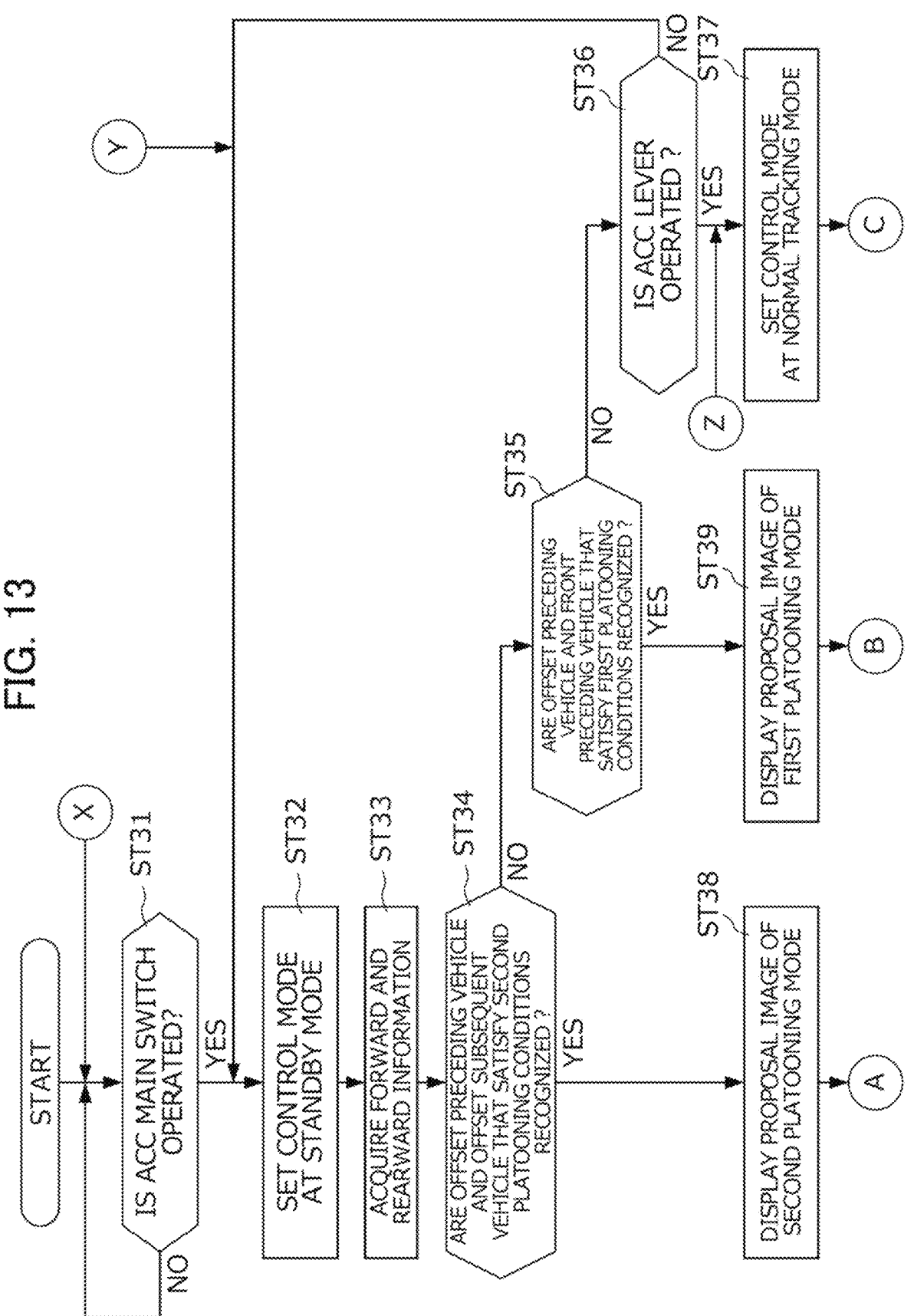
FIG. 13 is a flowchart indicating specific procedure of automatic traveling control (when the standby mode is set)

As indicated in FIG. 13, first, in step ST31, the driving support control apparatus 6 determines whether or not the ACC main switch 43 is operated. In a case where a determination result in step ST31 is No, the processing of the driving support control apparatus 6 returns to step ST31, and in a case where the determination result is Yes, the processing transitions to step ST32. In step ST32, the driving support control apparatus 6 sets the control mode of the automatic traveling control at the standby mode (see ST0 in FIG. 5), and the processing transitions to step ST33. In step ST33, the driving support control apparatus 6 acquires the forward information and the rearward information from the external sensor unit 2, and the processing transitions to step ST34.

In step ST34, the driving support control apparatus 6 determines whether or not an offset preceding vehicle and an offset subsequent vehicle that satisfy the above-described second platooning conditions (1*a*) to (2*a*) can be recognized on the basis of the forward information and the rearward information acquired in step ST33. In a case where the determination result in step ST34 is Yes, the processing of the driving support control apparatus 6 transitions to step ST38, and in a case where the determination result is No, the processing transitions to step ST35.

In step ST35, the driving support control apparatus 6 determines whether or not an offset preceding vehicle and a front preceding vehicle that satisfy the above-described first platooning conditions (1*c*) to (3*c*) can be recognized on the basis of the forward information acquired in step ST33. In a case where the determination result in step ST35 is Yes, the processing of the driving support control apparatus 6 transitions to step ST39, and in a case where the determination result is No, the processing transitions to step ST36.

In step ST36, the driving support control apparatus 6 determines whether or not the ACC lever 44 is operated. In a case where the determination result in step ST36 is Yes, the processing of the driving support control apparatus 6 transitions to step ST37, and in a case where the determination result is No, the processing returns to step ST32.

In step ST37, the driving support control apparatus 6 sets the control mode at the normal tracking mode (see ST1 in FIG. 5) in response to the ACC lever 44 being operated in a state where the control mode is set at the standby mode, and the processing transitions to step ST61.

In step ST38, the driving support control apparatus 6 displays the proposal image of the second platooning mode as illustrated in FIG. 11 at the display 41 (see ST3 in FIG. 5), and the processing transitions to step ST41.

In step ST39, the driving support control apparatus 6 displays the proposal image of the first platooning mode as illustrated in FIG. 8 at the display 41 (see ST5 in FIG. 5), and the processing transitions to step ST51.

Figure 14:
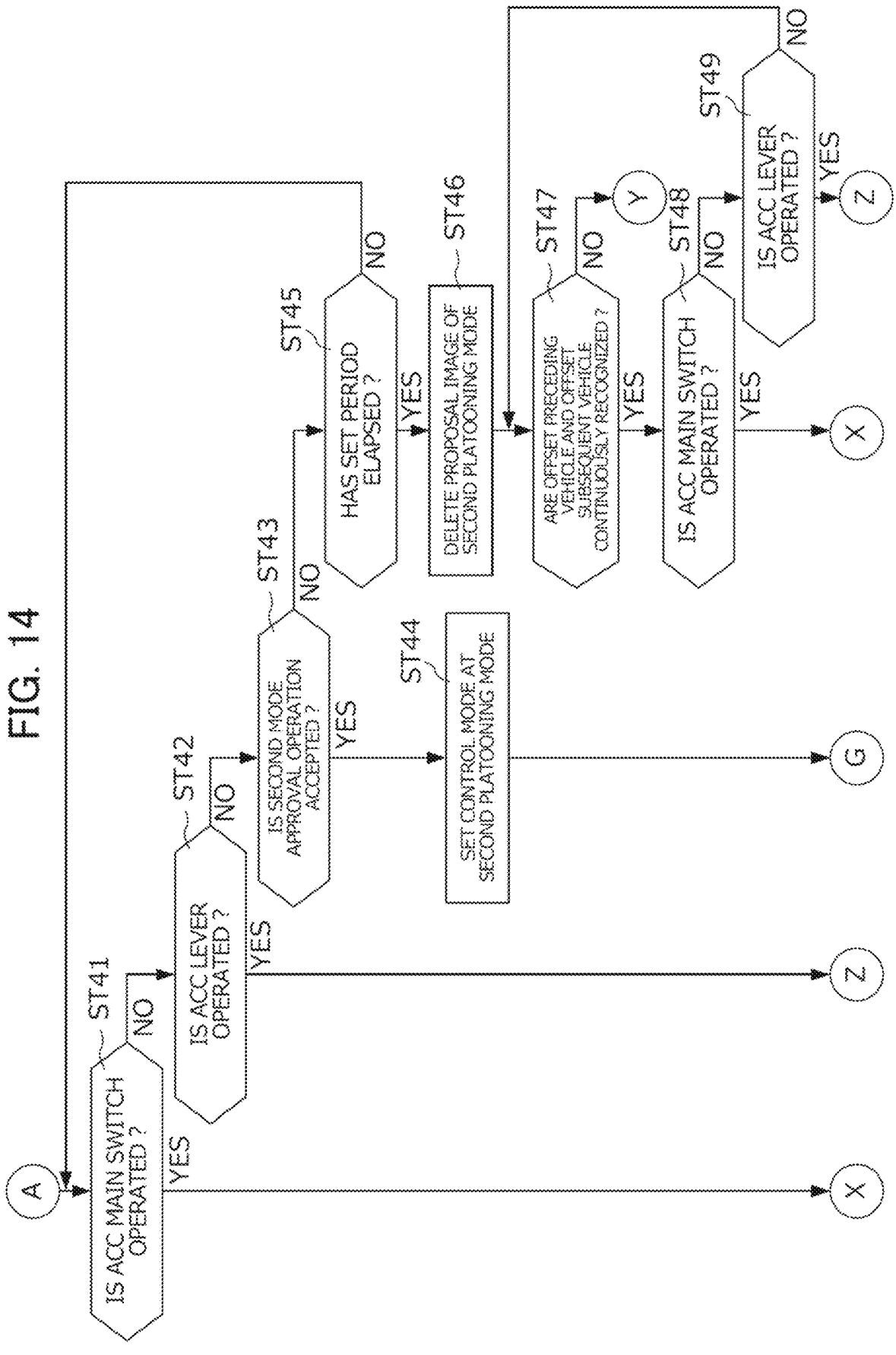
FIG. 14 is a flowchart indicating specific procedure of the automatic traveling control (when the second platooning mode is proposed while the standby mode is set)

As indicated in FIG. 14, after the proposal image of the second platooning mode is displayed at the display 41, in step ST41, the driving support control apparatus 6 determines whether or not the ACC main switch 43 is operated. In a case where the determination result in step ST41 is Yes, the processing of the driving support control apparatus 6 returns to step ST31 (see ST13 in FIG. 5), and in a case where the determination result is No, the processing transitions to step ST42.

In step ST42, the driving support control apparatus 6 determines whether or not the ACC lever 44 is operated. In a case where the determination result in step ST42 is Yes, the processing of the driving support control apparatus 6 transitions to step ST37 (see ST1 in FIG. 5) so that the control mode is set at the normal tracking mode. Further, in a case where the determination result in step ST42 is No, the processing of the driving support control apparatus 6 transitions to step ST43.

In step ST43, the driving support control apparatus 6 determines whether or not the second mode approval operation (for example, operation of the enter button) by the rider with respect to the proposal of the second platooning mode in the above-described step ST38 is accepted. In a case where the determination result in step ST43 is Yes, the processing of the driving support control apparatus 6 transitions to step ST44, and in a case where the determination result is No, the processing transitions to step ST45.

In step ST44, the driving support control apparatus 6 sets the control mode at the second platooning mode (see ST3 in FIG. 5) in response to the second mode approval operation by the rider being accepted while the proposal image of the second platooning mode is displayed, and the processing transitions to step ST111.

In step ST45, the driving support control apparatus 6 determines whether or not a predetermined set period has elapsed since the proposal image of the second platooning mode had been displayed for the first time in step ST38. In a case where the determination result in step ST45 is NO, the processing of the driving support control apparatus 6 returns to step ST41, and in a case where the determination result is Yes, the processing transitions to step ST46.

In step ST46, the driving support control apparatus 6 deletes the proposal image of the second platooning mode displayed in step ST38, and the processing transitions to step ST47. In step ST47, the driving support control apparatus 6 determines whether or not the offset preceding vehicle and the offset subsequent vehicle that are recognized for the first time in step ST34 are currently continuously recognized. In a case where the determination result in step ST47 is No, the processing of the driving support control apparatus 6 returns to step ST32 so as to determine whether or not platooning can be performed for a new group. Further, in a case where the determination result in step ST47 is Yes, the driving support control apparatus 6 determines that the rider is not willing to travel while forming a platoon with the offset preceding vehicle and the offset subsequent vehicle that are continuously recognized, and the processing transitions to step ST48.

In step ST48, the driving support control apparatus 6 determines whether or not the ACC main switch 43 is operated. In a case where the determination result in step ST48 is Yes, the processing of the driving support control apparatus 6 returns to step ST31 (see ST13 in FIG. 5), and in a case where the determination result is No, the processing transitions to step ST49. In step ST49, the driving support control apparatus 6 determines whether or not the ACC lever 44 is operated. In a case where the determination result in step ST49 is Yes, the processing of the driving support control apparatus 6 transitions to step ST37 so that the control mode is set at the normal tracking mode (see ST1 in FIG. 5). Further, in a case where the determination result in step ST49 is No, the processing of the driving support control apparatus 6 returns to step ST47.

Figure 15:
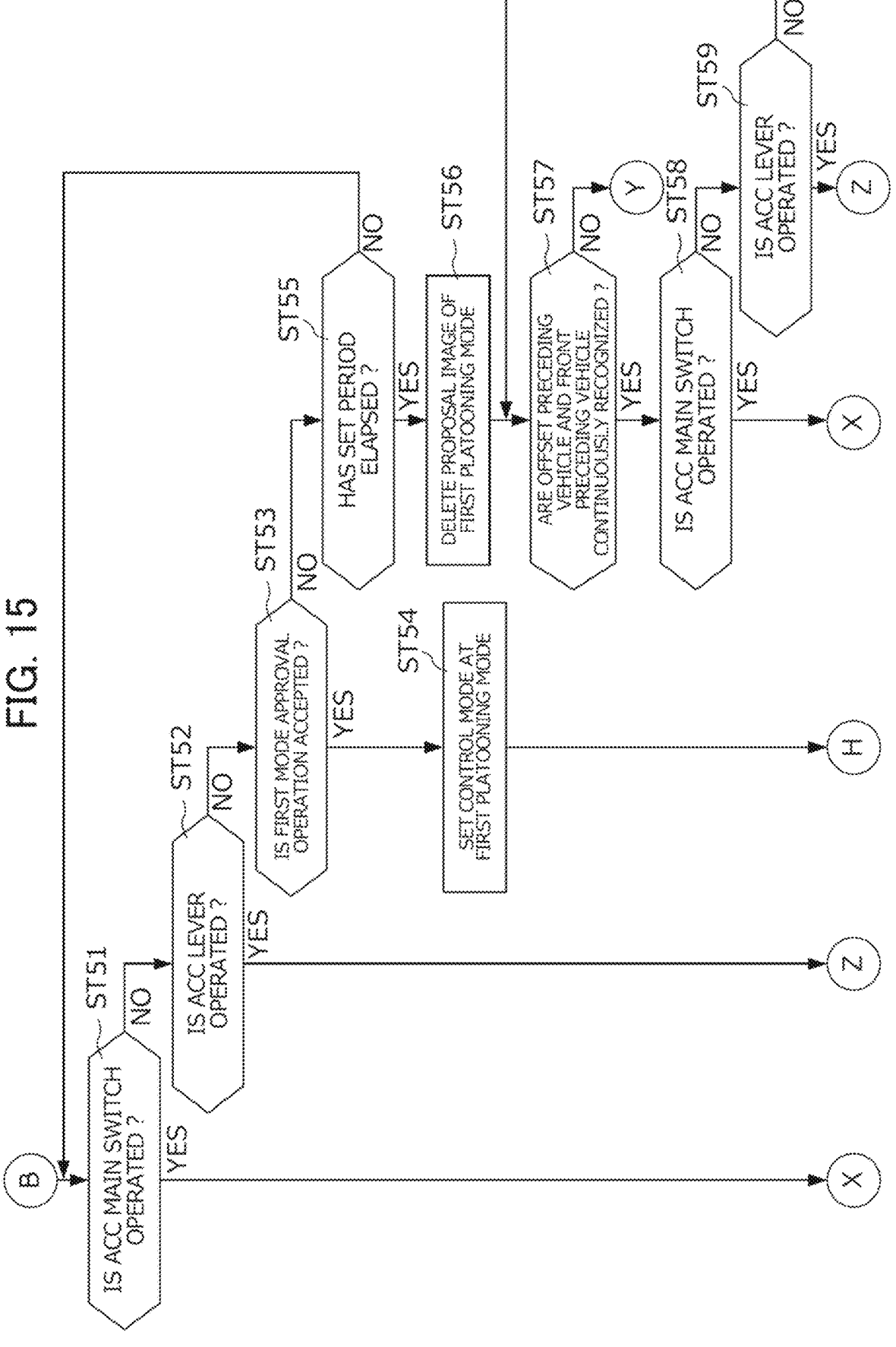
FIG. 15 is a flowchart indicating specific procedure of the automatic traveling control (when the first platooning mode is proposed while the standby mode is set)

As indicated in FIG. 15, after the proposal image of the first platooning mode is displayed at the display 41, in step ST51, the driving support control apparatus 6 determines whether or not the ACC main switch 43 is operated. In a case where the determination result in step ST51 is Yes, the processing of the driving support control apparatus 6 returns to step ST31 (see ST13 in FIG. 5), and in a case where the determination result is No, the processing transitions to step ST52.

In step ST52, the driving support control apparatus 6 determines whether or not the ACC lever 44 is operated. In a case where the determination result in step ST52 is Yes, the processing of the driving support control apparatus 6 transitions to step ST37 so that the control mode is set at the normal tracking mode (see ST1 in FIG. 5). Further, in a case where the determination result in step ST52 is No, the processing of the driving support control apparatus 6 transitions to step ST53.

In step ST53, the driving support control apparatus 6 determines whether or not the first mode approval operation (for example, operation of the enter button) by the rider with respect to the proposal of the first platooning mode in the above-described step ST39 is accepted. In a case where the determination result in step ST53 is Yes, the processing of the driving support control apparatus 6 transitions to step ST54, and in a case where the determination result is No, the processing transitions to step ST55.

In step ST54, the driving support control apparatus 6 sets the control mode at the first platooning mode (see ST5 in FIG. 5) in response to the first mode approval operation by the rider being accepted while the proposal image of the first platooning mode is displayed, and the processing transitions to step ST131.

In step ST55, the driving support control apparatus 6 determines whether or not a predetermined set period has elapsed since the proposal image of the first platooning mode had been displayed for the first time in step ST39. In a case where the determination result in step ST55 is No, the processing of the driving support control apparatus 6 returns to step ST51, and in a case where the determination result is Yes, the processing transitions to step ST56.

In step ST56, the driving support control apparatus 6 deletes the proposal image of the first platooning mode displayed in step ST39, and the processing transitions to step ST57. In step ST57, the driving support control apparatus 6 determines whether or not the offset preceding vehicle and the front preceding vehicle that are recognized for the first time in step ST35 are currently continuously recognized. In a case where the determination result in step ST57 is No, the processing of the driving support control apparatus 6 returns to step ST32 so as to determine whether or not platooning can be performed for a new group. Further, in a case where the determination result in step ST57 is Yes, the driving support control apparatus 6 determines that the rider is not willing to travel while forming a platoon with the offset preceding vehicle and the front preceding vehicle that are continuously recognized, and the processing transitions to step ST58.

In step ST58, the driving support control apparatus 6 determines whether or not the ACC main switch 43 is operated. In a case where the determination result in step ST58 is Yes, the processing of the driving support control apparatus 6 returns to step ST31 (see ST13 in FIG. 5), and in a case where the determination result is No, the processing transitions to step ST59. In step ST59, the driving support control apparatus 6 determines whether or not the ACC lever 44 is operated. In a case where the determination result in step ST59 is Yes, the processing of the driving support control apparatus 6 transitions to step ST37 (see ST1 in FIG. 5) so that the control mode is set at the normal tracking mode. Further, in a case where the determination result in step ST59 is No, the processing of the driving support control apparatus 6 returns to step ST57.

Figure 16:
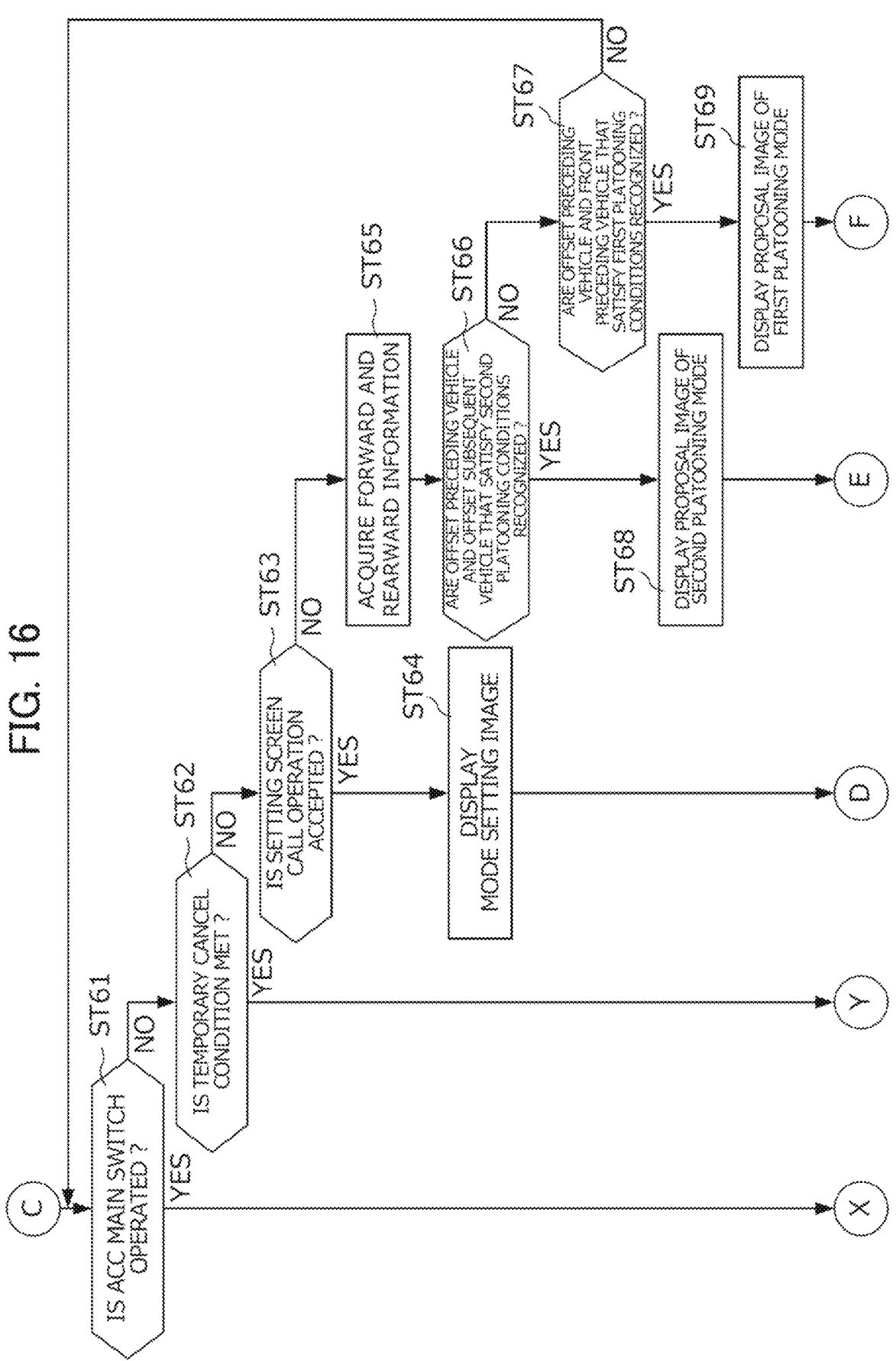
FIG. 16 is a flowchart indicating specific procedure of the automatic traveling control (when a normal tracking mode is set)

As indicated in FIG. 16, after the control mode is set at the normal tracking mode, in step ST61, the driving support control apparatus 6 determines whether or not the ACC main switch 43 is operated. In a case where the determination result in step ST61 is Yes, the processing of the driving support control apparatus 6 returns to step ST31 (see ST13 in FIG. 5), and in a case where the determination result is No, the processing transitions to step ST62.

In step ST62, the driving support control apparatus 6 determines whether or not the temporary cancel condition of the normal tracking mode as described above is met. In a case where the determination result in step ST62 is Yes, the processing of the driving support control apparatus 6 returns to step ST32 so that the control mode is returned to the standby mode (see ST2 in FIG. 5). In a case where the determination result in step ST62 is No, the processing of the driving support control apparatus 6 transitions to step ST63.

In step ST63, the driving support control apparatus 6 determines whether or not setting screen call operation on the setting button 45 by the rider is accepted. In a case where the determination result in step ST63 is Yes, the processing of the driving support control apparatus 6 transitions to step ST64, and in a case where the determination result is No, the processing transitions to step ST65.

In step ST64, the driving support control apparatus 6 displays the mode setting image as illustrated in FIG. 9 at the display 41, and the processing transitions to step ST71.

In step ST65, the driving support control apparatus 6 acquires the forward information and the rearward information from the external sensor unit 2, and the processing transitions to step ST66. In step ST66, the driving support control apparatus 6 determines whether or not an offset preceding vehicle and an offset subsequent vehicle that satisfy the above-described second platooning conditions (1a) to (2a) can be recognized on the basis of the forward information and the rearward information acquired in step ST65. In a case where the determination result in step ST66 is Yes, the processing of the driving support control apparatus 6 transitions to step ST68, and in a case where the determination result is No, the processing transitions to step ST67.

In step ST67, the driving support control apparatus 6 determines whether or not an offset preceding vehicle and a front preceding vehicle that satisfy the above-described first platooning conditions (1c) to (3c) can be recognized on the basis of the forward information acquired in step ST66. In a case where the determination result in step ST67 is Yes, the processing of the driving support control apparatus 6 transitions to step ST69, and in a case where the determination result is No, the processing returns to step ST61.

In step ST68, the driving support control apparatus 6 displays the proposal image of the second platooning mode as illustrated in FIG. 11 at the display 41 (see ST7 in FIG. 5), and the processing transitions to step ST91.

In step ST69, the driving support control apparatus 6 displays the proposal image of the first platooning mode as illustrated in FIG. 8 at the display 41 (see ST9 in FIG. 5), and the processing transitions to step ST101.

Figure 17A:
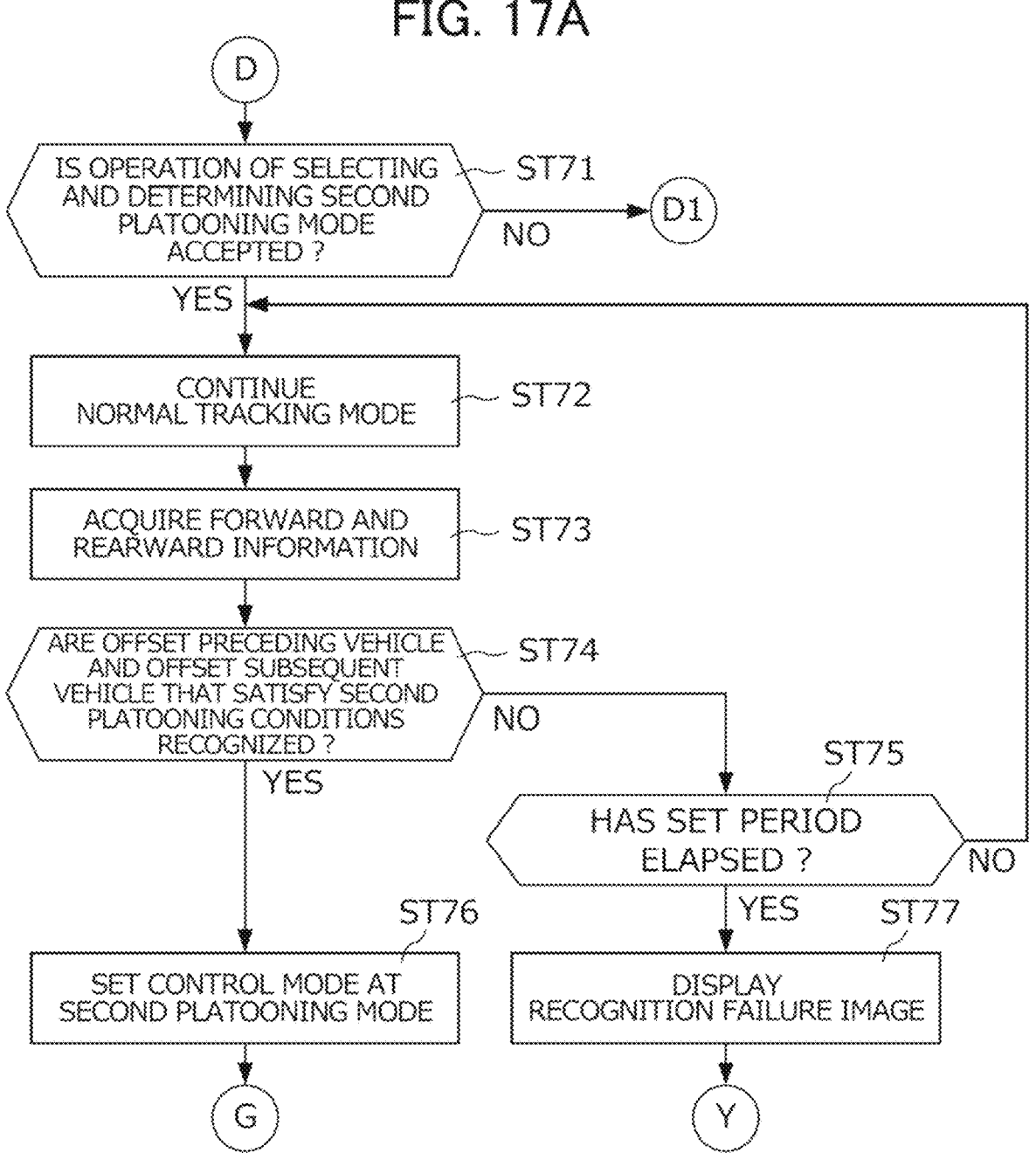
FIG. 17A is a flowchart indicating specific procedure of the automatic traveling control (when the mode setting image is displayed)

As indicated in FIG. 17A, after the mode setting image is displayed at the display 41, in step ST71, the driving support control apparatus 6 determines whether or not operation of selecting and determining the second platooning mode on the setting button 45 by the rider is accepted. In a case where the determination result in step ST71 is Yes, the processing transitions to step ST72, and in a case where the determination result is No, the processing transitions to step ST78.

In step ST72, the driving support control apparatus 6 continuously sets the control mode at the normal tracking mode, and the processing transitions to step ST73. In step ST73, the driving support control apparatus 6 acquires the forward information and the rearward information from the external sensor unit 2, and the processing transitions to step ST74.

In step ST75, the driving support control apparatus 6 determines whether or not an offset preceding vehicle and an offset subsequent vehicle that satisfy the above-described second platooning conditions (1a) to (2a) can be recognized on the basis of the forward information and the rearward information acquired in step ST73. In a case where the determination result in step ST75 is Yes, the processing of the driving support control apparatus 6 transitions to step ST76, and in a case where the determination result is No, the processing transitions to step ST75.

In step ST75, the driving support control apparatus 6 determines whether or not a predetermined set period has elapsed since selection and determination operation by the rider had been accepted for the first time in step ST71. In a case where the determination result in step ST75 is Yes, the processing transitions to step ST77, and in a case where the determination result is No, the processing returns to step ST72.

In step ST76, the driving support control apparatus 6 sets the control mode at the second platooning mode (see ST7 in FIG. 5) in response to a series of second mode setting operation by the rider being accepted and an offset preceding vehicle and an offset subsequent vehicle that satisfy the second platooning conditions (1a) to (2a) being recognized, and the processing transitions to step ST111.

In step ST77, the driving support control apparatus 6 displays a predetermined recognition failure image at the display 41 in response to failure in recognition of an offset preceding vehicle and an offset subsequent vehicle that satisfy the second platooning conditions (1a) to (2a) until the set period has elapsed since the second mode setting operation by the rider had been accepted, and the processing returns to step ST32 so that the control mode is reset to the standby mode.

Figure 17B:
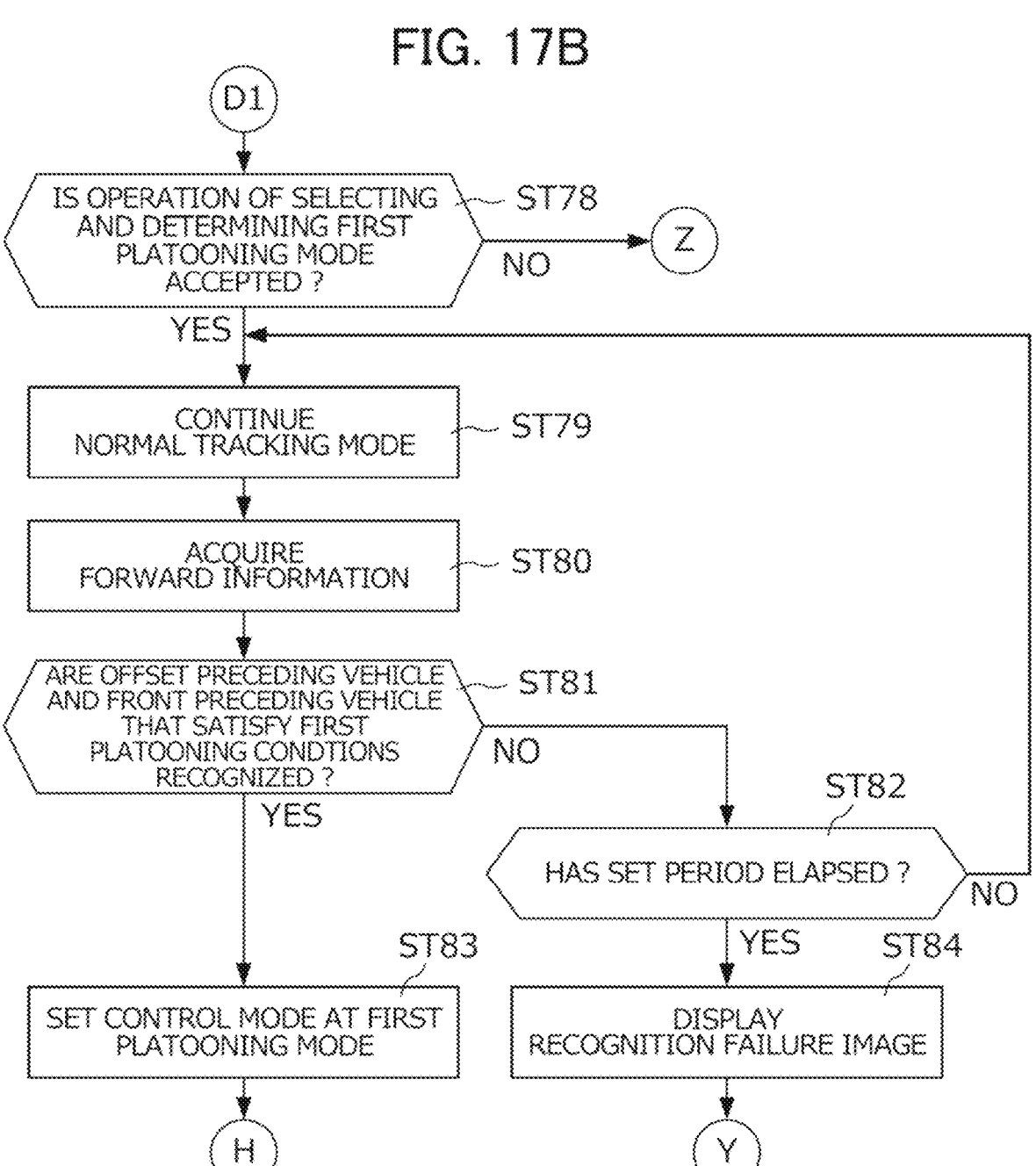
FIG. 17B is a flowchart indicating specific procedure of the automatic traveling control (when the mode setting image is displayed)

As indicated in FIG. 17B, after the mode setting image is displayed at the display 41, in step ST78, the driving support control apparatus 6 determines whether or not operation of selecting and determining the first platooning mode on the setting button 45 by the rider is accepted. In a case where the determination result in step ST78 is Yes, the processing transitions to step ST79, and in a case where the determination result is No, the processing returns to step ST37 so that the control mode is continuously set at the normal tracking mode.

In step ST79, the driving support control apparatus 6 continuously sets the control mode at the normal tracking mode, and the processing transitions to step ST80. In step ST80, the driving support control apparatus 6 acquires the forward information from the external sensor unit 2, and the processing transitions to step ST81.

In step ST81, the driving support control apparatus 6 determines whether or not an offset preceding vehicle and a front preceding vehicle that satisfy the above-described first platooning conditions (1c) to (3c) can be recognized on the basis of the forward information acquired in step ST80. In a case where the determination result in step ST81 is Yes, the processing of the driving support control apparatus 6 transitions to step ST83, and in a case where the determination result is No, the processing transitions to step ST82.

In step ST82, the driving support control apparatus 6 determines whether or not a predetermined set period has elapsed since selection and determination operation by the rider had been accepted for the first time in step ST78. In a case where the determination result in step ST82 is Yes, the processing transitions to step ST84, and in a case where the determination result is No, the processing returns to step ST79.

In step ST83, the driving support control apparatus 6 sets the control mode at the first platooning mode (see ST9 in FIG. 5) in response to a series of first mode setting operation by the rider being accepted and an offset preceding vehicle and a front preceding vehicle that satisfy the first platooning conditions (1*c*) to (3*c*) being recognized, and the processing transitions to step ST131.

In step ST84, the driving support control apparatus 6 displays a predetermined recognition failure image at the display 41 in response to failure in recognition of an offset preceding vehicle and a front preceding vehicle that satisfy the first platooning conditions (1*c*) to (3*c*) until the set period has elapsed since the first mode setting operation by the rider had been accepted, and the processing returns to step ST32 so that the control mode is reset to the standby mode.

Figure 18:
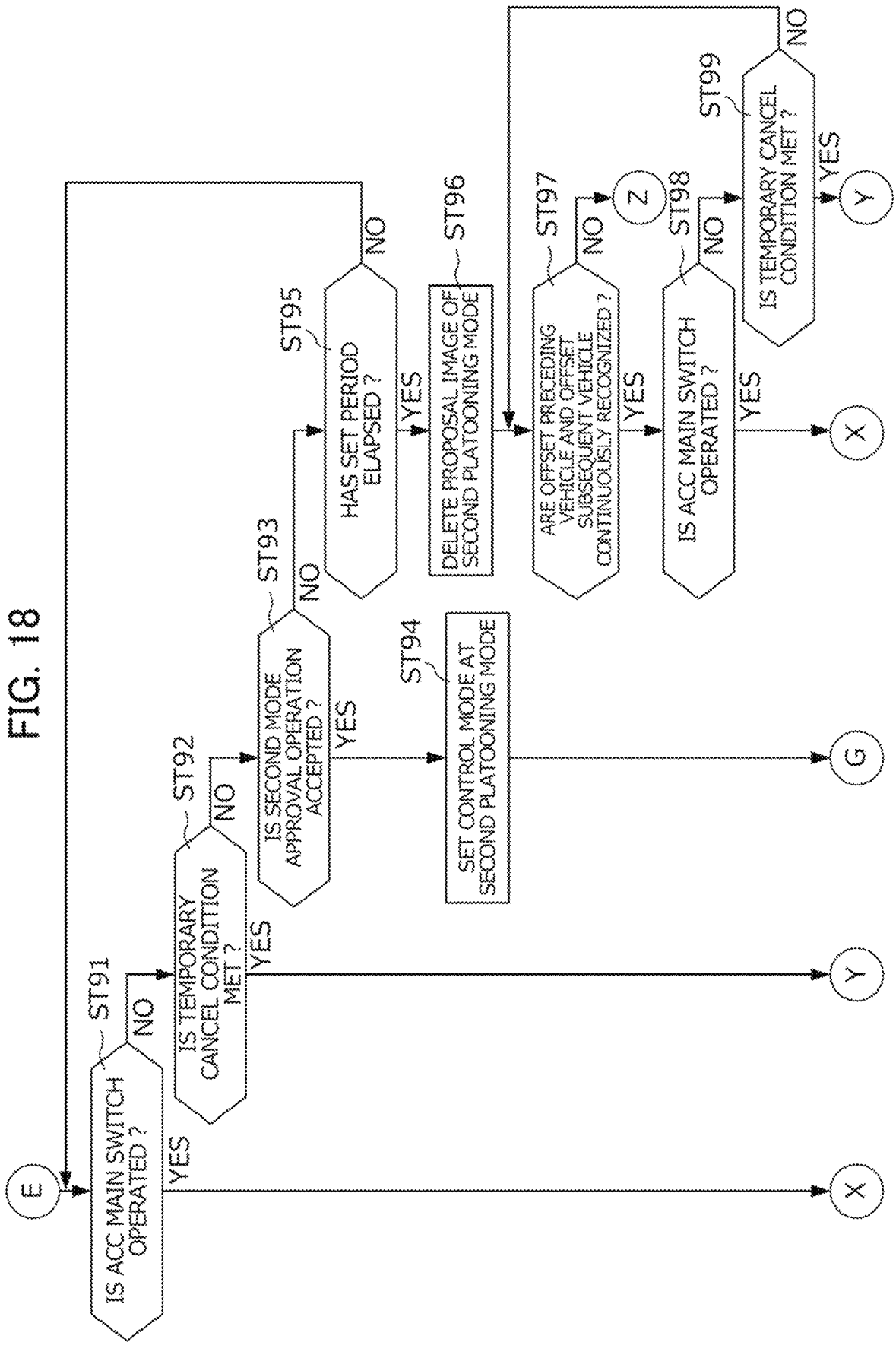
FIG. 18 is a flowchart indicating specific procedure of the automatic traveling control (when the second platooning mode is proposed while the normal tracking mode is set)

As indicated in FIG. 18, after the proposal image of the second platooning mode is displayed at the display 41 during traveling under the normal tracking mode, in step ST91, the driving support control apparatus 6 determines whether or not the ACC main switch 43 is operated. In a case where the determination result in step ST91 is Yes, the processing of the driving support control apparatus 6 returns to step ST31 (see ST13 in FIG. 5), and in a case where the determination result is No, the processing transitions to step ST92.

In step ST92, the driving support control apparatus 6 determines whether or not the temporary cancel condition of the normal tracking mode as described above is met. In a case where the determination result in step ST92 is Yes, the processing of the driving support control apparatus 6 returns to step ST32 so that the control mode is returned to the standby mode (see ST2 in FIG. 5). In a case where the determination result in step ST92 is No, the processing of the driving support control apparatus 6 transitions to step ST93.

In step ST93, the driving support control apparatus 6 determines whether or not second mode approval operation (for example, operation of the enter button) by the rider with respect to the proposal of the second platooning mode in the above-described step ST68 is accepted. In a case where the determination result in step ST93 is Yes, the processing of the driving support control apparatus 6 transitions to step ST94, and in a case where the determination result is No, the processing transitions to step ST95.

In step ST94, the driving support control apparatus 6 sets the control mode at the second platooning mode (see ST7 in FIG. 5) in response to the second mode approval operation by the rider being accepted while the proposal image of the second platooning mode is displayed, and the processing transitions to step ST111.

In step ST95, the driving support control apparatus 6 determines whether or not a predetermined set period has elapsed since the proposal image of the second platooning mode had been displayed for the first time in step ST68. In a case where the determination result in step ST95 is No, the processing of the driving support control apparatus 6 returns to step ST91, and in a case where the determination result is Yes, the processing transitions to step ST96.

In step ST96, the driving support control apparatus 6 deletes the proposal image of the second platooning mode displayed in step ST68, and the processing transitions to step ST97. In step ST97, the driving support control apparatus 6 determines whether or not the offset preceding vehicle and the offset subsequent vehicle that are recognized for the first time in step ST66 are currently continuously recognized. In a case where the determination result in step ST97 is No, the processing of the driving support control apparatus 6 returns to step ST37 so that the control mode is continuously set at the normal tracking mode. Further, in a case where the determination result in step ST97 is Yes, the driving support control apparatus 6 determines that the rider is not willing to travel while forming a platoon with the offset preceding vehicle and the offset subsequent vehicle that are continuously recognized, and the processing transitions to step ST98.

In step ST98, the driving support control apparatus 6 determines whether or not the ACC main switch 43 is operated. In a case where the determination result in step ST98 is Yes, the processing of the driving support control apparatus 6 returns to step ST31 (see ST13 in FIG. 5), and in a case where the determination result is No, the processing transitions to step ST99. In step ST99, the driving support control apparatus 6 determines whether or not the temporary cancel condition of the normal tracking mode as described above is met. In a case where the determination result in step ST99 is Yes, the processing of the driving support control apparatus 6 transitions to step ST32 so that the control mode is returned to the standby mode (see ST2 in FIG. 5). Further, in a case where the determination result in step ST99 is No, the processing of the driving support control apparatus 6 returns to step ST97.

Figure 19:
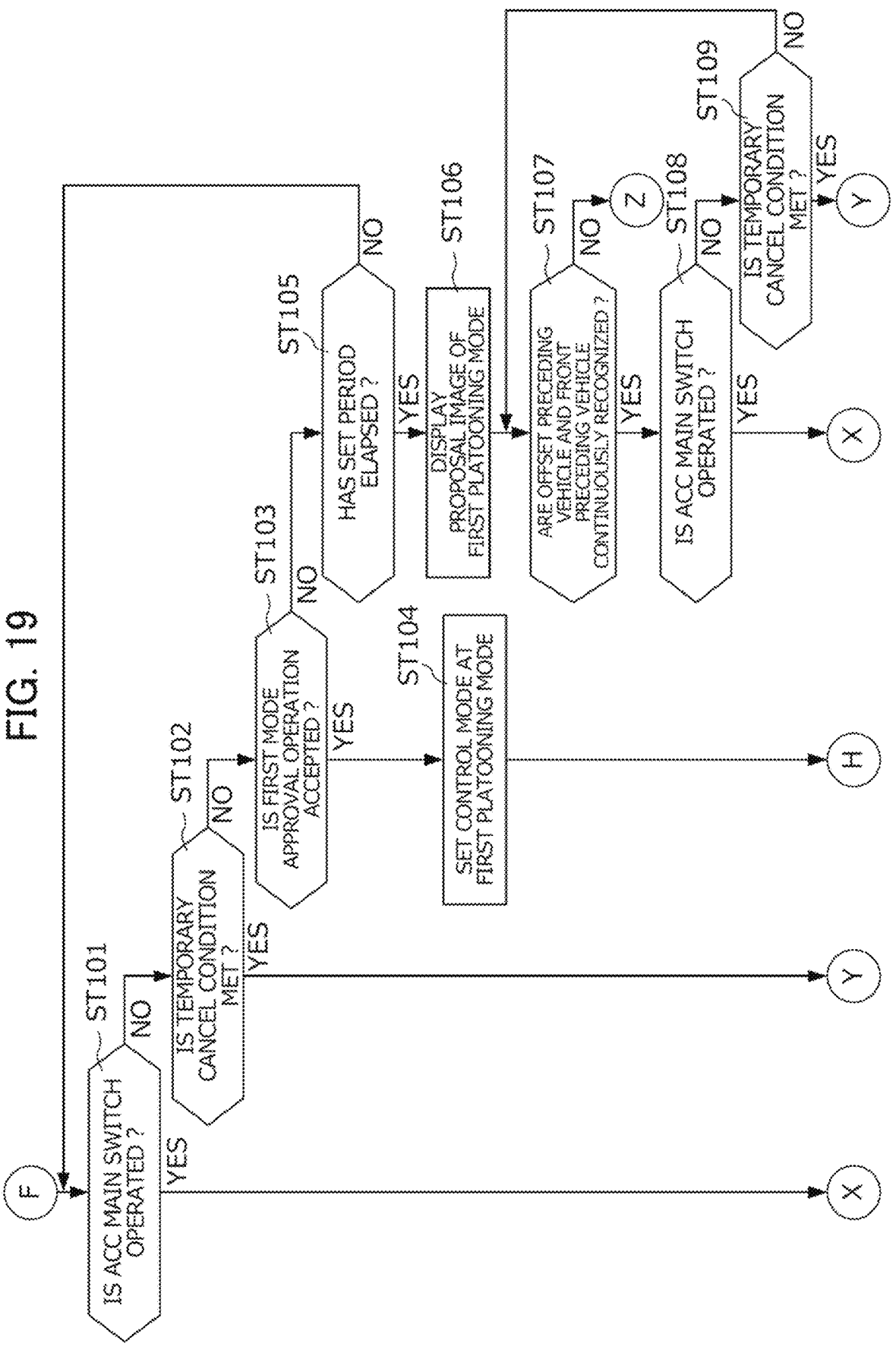
FIG. 19 is a flowchart indicating specific procedure of the automatic traveling control (when the first platooning mode is proposed while the normal tracking mode is set)

As indicated in FIG. 19, after the proposal image of the first platooning mode is displayed at the display 41 during traveling under the normal tracking mode, in step ST101, the driving support control apparatus 6 determines whether or not the ACC main switch 43 is operated. In a case where the determination result in step ST101 is Yes, the processing of the driving support control apparatus 6 returns to step ST31 (see ST13 in FIG. 5), and in a case where the determination result is No, the processing transitions to step ST102.

In step ST102, the driving support control apparatus 6 determines whether or not the temporary cancel condition of the normal tracking mode as described above is met. In a case where the determination result in step ST102 is Yes, the processing of the driving support control apparatus 6 returns to step ST32 so that the control mode is returned to the standby mode (see ST2 in FIG. 5). In a case where the determination result in step ST102 is No, the processing of the driving support control apparatus 6 transitions to step ST103.

In step ST103, the driving support control apparatus 6 determines whether or not the first mode approval operation (for example, operation of the enter button) by the rider with respect to the proposal of the first platooning mode in the above-described step ST69 is accepted. In a case where the determination result in step ST103 is Yes, the processing of the driving support control apparatus 6 transitions to step ST104, and in a case where the determination result is No, the processing transitions to step ST105.

In step ST104, the driving support control apparatus 6 sets the control mode at the first platooning mode (see ST9 in FIG. 5) in response to the first mode approval operation by the rider being accepted while the proposal image of the first platooning mode is displayed, and the processing transitions to step ST131.

In step ST105, the driving support control apparatus 6 determines whether or not a predetermined set period has elapsed since the proposal image of the first platooning mode had been displayed for the first time in step ST69. In a case where the determination result in step ST105 is No, the processing of the driving support control apparatus 6 returns to step ST101, and in a case where the determination result is Yes, the processing transitions to step ST106.

In step ST106, the driving support control apparatus 6 deletes the proposal image of the first platooning mode displayed in step ST69, and the processing transitions to step ST107. In step ST107, the driving support control apparatus 6 determines whether or not the offset preceding vehicle and the front preceding vehicle that are recognized for the first time in step ST67 are currently continuously recognized. In a case where the determination result in step ST107 is No, the processing of the driving support control apparatus 6 returns to step ST37 so that the control mode is continuously set at the normal tracking mode. Further, in a case where the determination result in step ST107 is Yes, the driving support control apparatus 6 determines that the rider is not willing to travel while forming a platoon with the offset preceding vehicle and the front preceding vehicle that are continuously recognized, and the processing transitions to step ST108.

In step ST108, the driving support control apparatus 6 determines whether or not the ACC main switch 43 is operated. In a case where the determination result in step ST108 is Yes, the processing of the driving support control apparatus 6 returns to step ST31 (see ST13 in FIG. 5), and in a case where the determination result is No, the processing transitions to step ST109. In step ST109, the driving support control apparatus 6 determines whether or not the temporary cancel condition of the normal tracking mode as described above is met. In a case where the determination result in step ST109 is Yes, the processing of the driving support control apparatus 6 transitions to step ST32 so that the control mode is returned to the standby mode (see ST2 in FIG. 5). Further, in a case where the determination result in step ST109 is No, the processing of the driving support control apparatus 6 returns to step ST107.

Figure 20A:
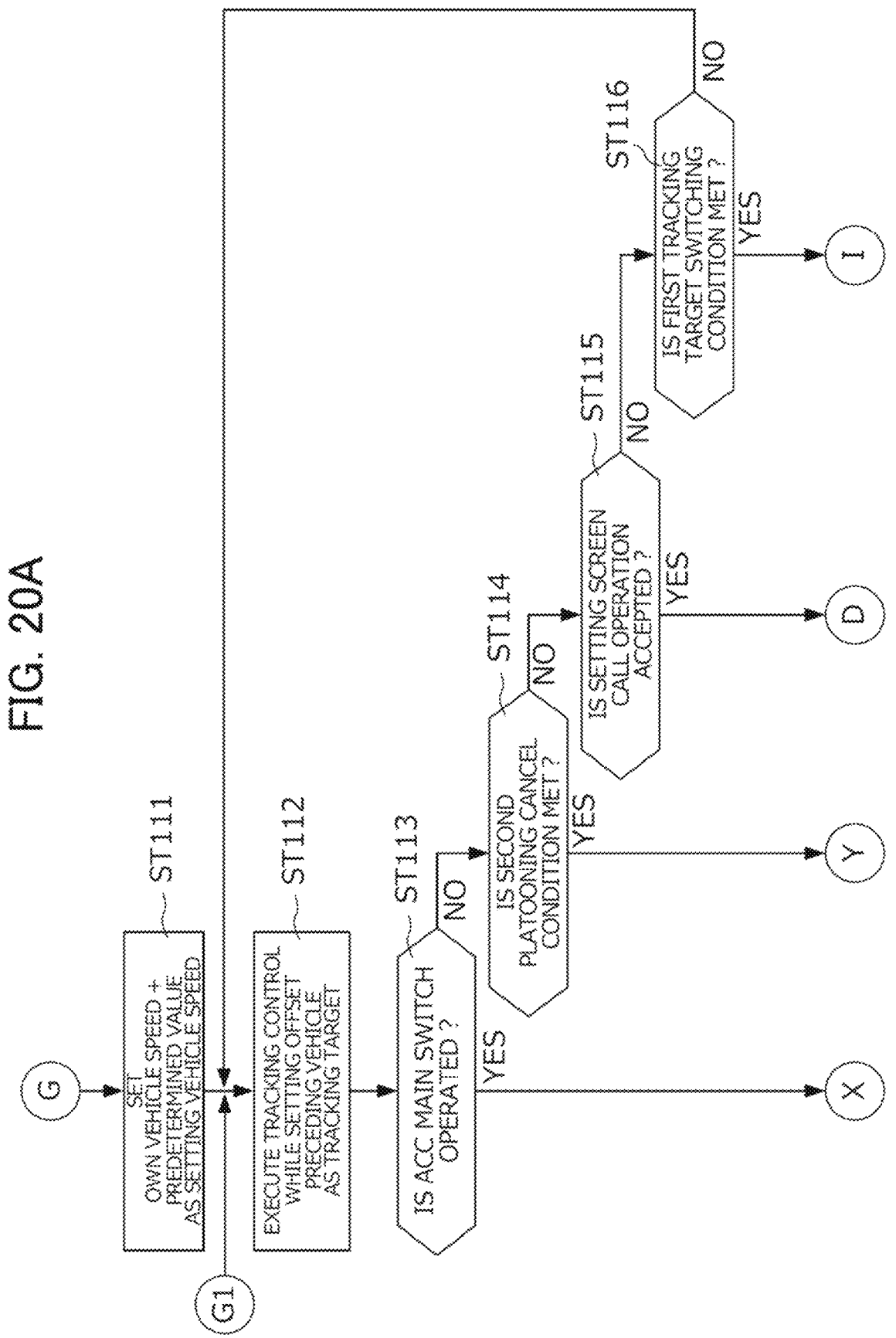
FIG. 20A is a flowchart indicating specific procedure of the automatic traveling control (when the second platooning mode is set)

As indicated in FIG. 20A, if the control mode is set at the second platooning mode, in step ST111, the driving support control apparatus 6 sets speed obtained by adding a predetermined value to current own vehicle speed as the setting vehicle speed, and the processing transitions to step ST112.

In step ST112, the driving support control apparatus 6 sets the offset preceding vehicle as the tracking target and executes tracking control with respect to the tracking target, and the processing transitions to step ST113.

In step ST113, the driving support control apparatus 6 determines whether or not the ACC main switch 43 is operated. In a case where the determination result in step ST113 is Yes, the processing of the driving support control apparatus 6 returns to step ST31 (see ST13 in FIG. 5), and in a case where the determination result is No, the processing transitions to step ST114.

In step ST114, the driving support control apparatus 6 determines whether or not one of the above-described second platooning cancel conditions (1*b*) to (6*b*) is met. In a case where the determination result in step ST114 is Yes, the processing of the driving support control apparatus 6 transitions to step ST32 so that the control mode is set at the standby mode (see ST4 in FIG. 5), and in a case where the determination result is No, the processing transitions to step ST115.

In step ST115, the driving support control apparatus 6 determines whether or not the setting screen call operation on the setting button 45 by the rider is accepted. In a case where the determination result in step ST115 is Yes, the processing of the driving support control apparatus 6 transitions to step ST71, and in a case where the determination result is No, the processing transitions to step ST116.

In step ST116, the driving support control apparatus 6 determines whether or not a predetermined first tracking target switching condition is met. Here, the first tracking target switching condition is a condition for switching the tracking target from an offset preceding vehicle to a virtual offset preceding vehicle during traveling under the second platooning mode, and is that, as described with reference to FIG. 4B, as a result of the offset preceding vehicle decelerating, the offset preceding vehicle goes out of the detection range 22R of the forward radar unit. In a case where the determination result in step ST116 is Yes, the processing of the driving support control apparatus 6 transitions to step ST118 so that the virtual offset preceding vehicle is set as the tracking target, and in a case where the determination result is No, the processing returns to step ST112.

Figure 20B:
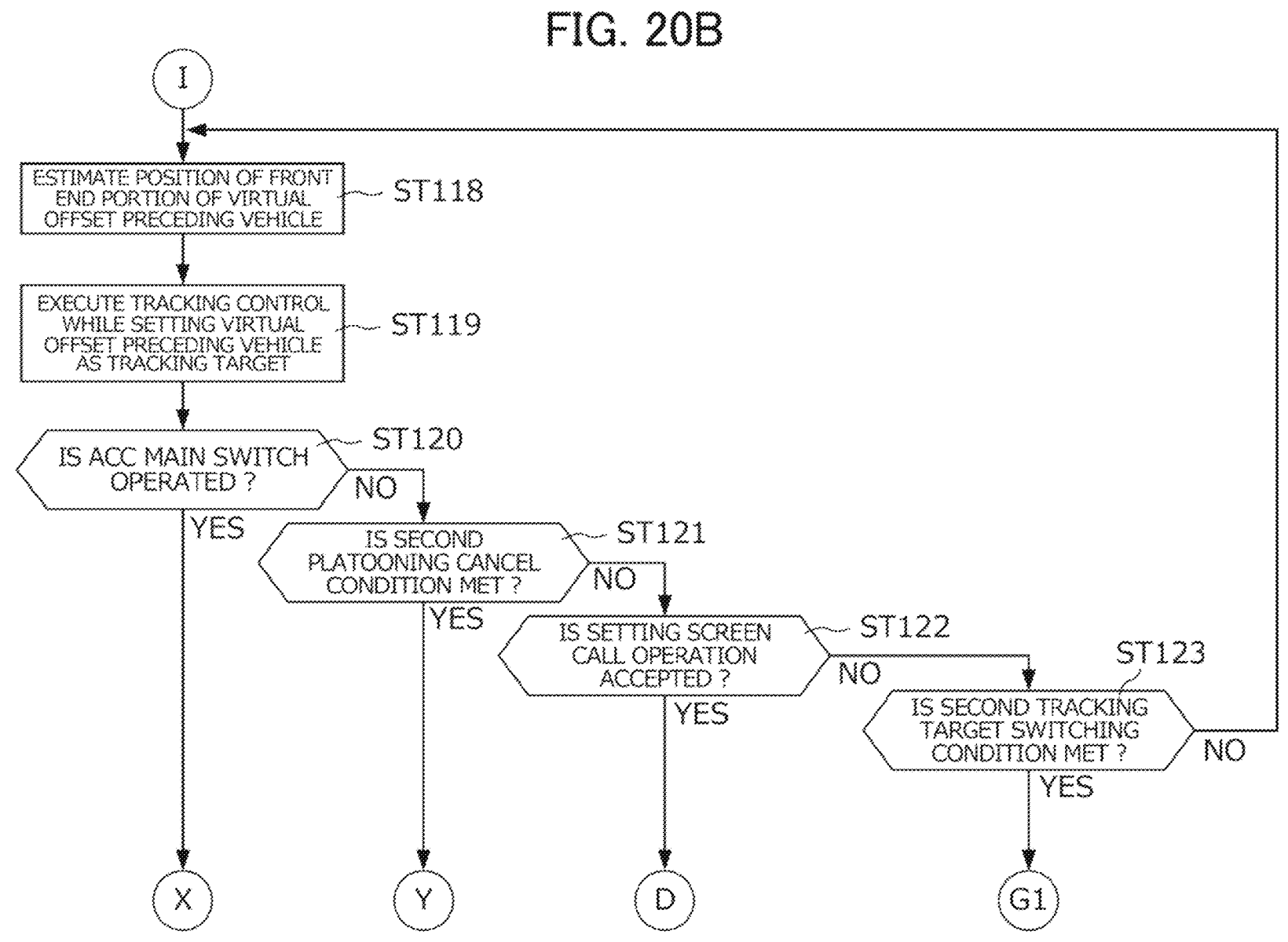

As indicated in FIG. 20B, in step ST118, the driving support control apparatus 6 estimates a position of a front end portion of the virtual offset preceding vehicle on the basis of the rearward information, and the processing transitions to step ST119. More specifically, the driving support control apparatus 6 acquires a position of a front end portion of the offset subsequent vehicle on the basis of the rearward information and estimates the position of the front end portion of the virtual offset preceding vehicle by assuming that the offset preceding vehicle exists ahead of the offset subsequent vehicle at a position separated by a predetermined distance.

In step ST119, the driving support control apparatus 6 sets the virtual offset preceding vehicle as the tracking target and executes tracking control with respect to the tracking target, and the processing transitions to step ST120.

In step ST120, the driving support control apparatus 6 determines whether or not the ACC main switch 43 is operated. In a case where the determination result in step ST120 is Yes, the processing of the driving support control apparatus 6 returns to step ST31 (see ST13 in FIG. 5), and in a case where the determination result is No, the processing transitions to step ST121.

In step ST121, the driving support control apparatus 6 determines whether or not one of the above-described second platooning cancel conditions (1*b*) to (6*b*) is met. In a case where the determination result in step ST121 is Yes, the processing of the driving support control apparatus 6 transitions to step ST32 so that the control mode is set at the standby mode (see ST4 in FIG. 5), and in a case where the determination result is No, the processing transitions to step ST122.

In step ST122, the driving support control apparatus 6 determines whether or not the setting screen call operation on the setting button 45 by the rider is accepted. In a case where the determination result in step ST122 is Yes, the processing of the driving support control apparatus 6 transitions to step ST71, and in a case where the determination result is No, the processing transitions to step ST123.

In step ST123, the driving support control apparatus 6 determines whether or not a predetermined second tracking target switching condition is met. Here, the second tracking target switching condition is a condition for switching the tracking target from a virtual offset preceding vehicle to an offset preceding vehicle during traveling under the second platooning mode, and is that, as described with reference to FIG. 4B, the offset preceding vehicle falls within the detection range 22R of the forward radar unit. In a case where the determination result in step ST123 is Yes, the processing of the driving support control apparatus 6 transitions to step ST112 so that the offset preceding vehicle is set as the tracking target, and in a case where the determination result is No, the processing returns to step ST118.

Figure 21A:
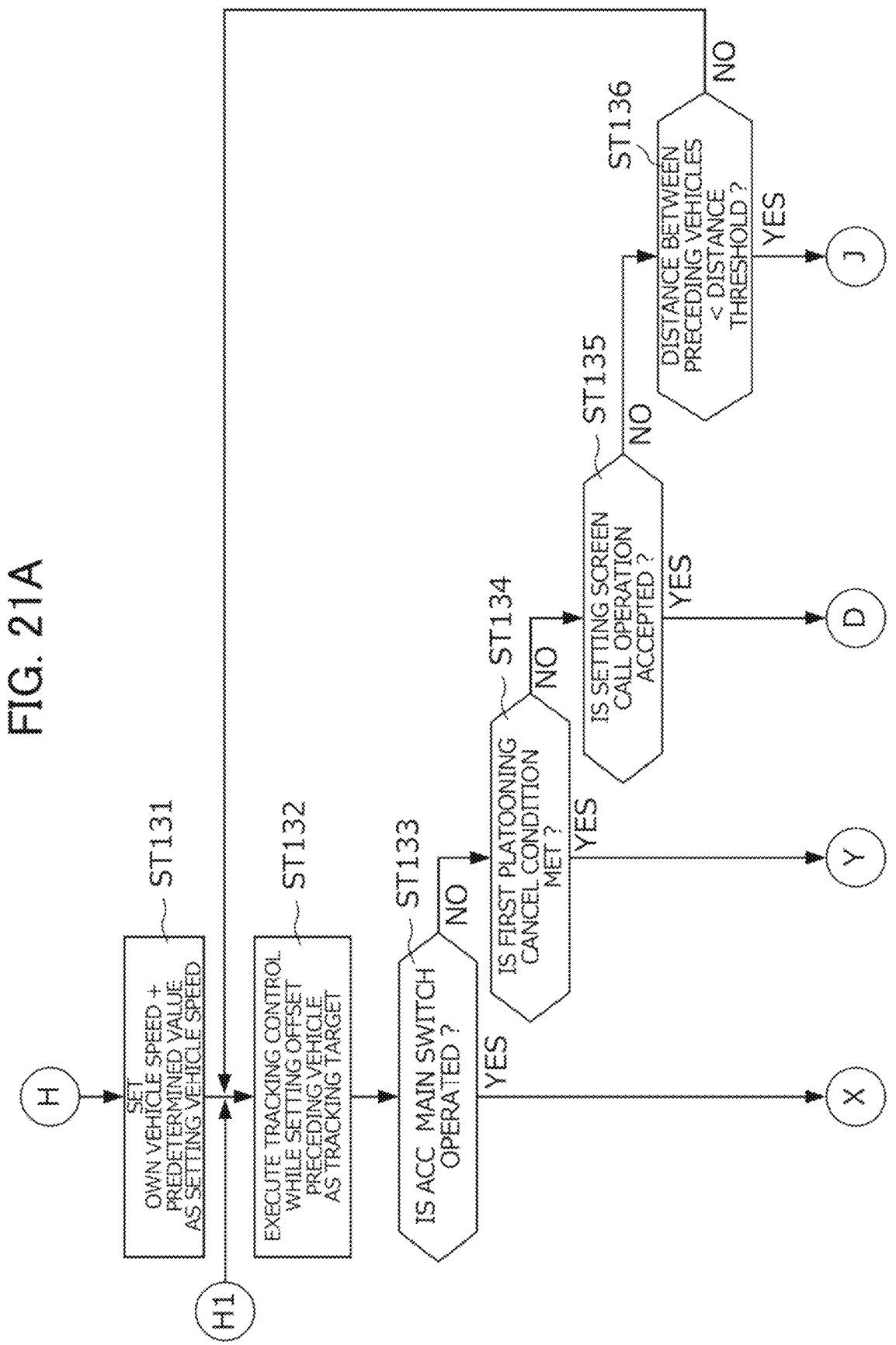
FIG. 21A is a flowchart indicating specific procedure of the automatic traveling control (when the first platooning mode is set)

As indicated in FIG. 21A, if the control mode is set at the first platooning mode, in step ST131, the driving support control apparatus 6 sets speed obtained by adding a predetermined value to current own vehicle speed as the setting vehicle speed, and the processing transitions to step ST132.

In step ST132, the driving support control apparatus 6 sets the offset preceding vehicle as the tracking target and executes tracking control with respect to the tracking target, and the processing transitions to step ST133.

In step ST133, the driving support control apparatus 6 determines whether or not the ACC main switch 43 is operated. In a case where the determination result in step ST133 is Yes, the processing of the driving support control apparatus 6 returns to step ST31 (see ST13 in FIG. 5), and in a case where the determination result is No, the processing transitions to step ST134.

In step ST134, the driving support control apparatus 6 determines whether or not one of the above-described first platooning cancel conditions (1d) to (6d) is met. In a case where the determination result in step ST134 is Yes, the processing of the driving support control apparatus 6 transitions to step ST32 so that the control mode is set at the standby mode (see ST6 in FIG. 5), and in a case where the determination result is No, the processing transitions to step ST135.

In step ST135, the driving support control apparatus 6 determines whether or not the setting screen call operation on the setting button 45 by the rider is accepted. In a case where the determination result in step ST135 is Yes, the processing of the driving support control apparatus 6 transitions to step ST71, and in a case where the determination result is No, the processing transitions to step ST136.

In step ST136, the driving support control apparatus 6 determines whether or not a distance between preceding vehicles that is a distance between the offset preceding vehicle and the front preceding vehicle is less than a distance threshold. In a case where the determination result in step ST136 is Yes, the processing of the driving support control apparatus 6 transitions to step ST138 so that the front preceding vehicle is set as the tracking target, and in a case where the determination result is No, the processing transitions to step ST132.

Figure 21B:
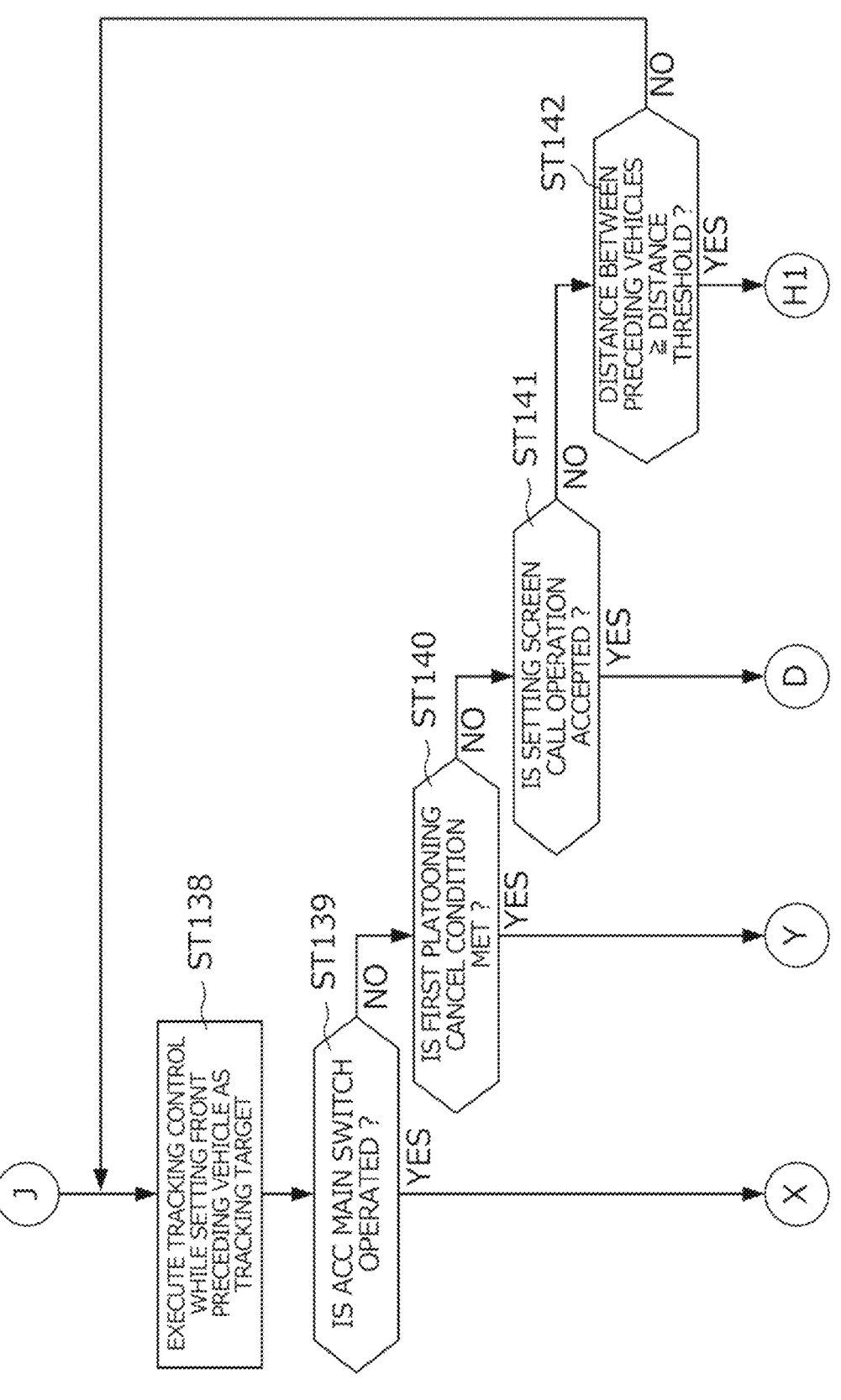
FIG. 21B is a flowchart indicating specific procedure of the automatic traveling control (when the first platooning mode is set).

As indicated in FIG. 21B, in step ST138, the driving support control apparatus 6 sets the front preceding vehicle as the tracking target and executes tracking control with respect to the tracking target, and the processing transitions to step ST139.

In step ST139, the driving support control apparatus 6 determines whether or not the ACC main switch 43 is operated. In a case where the determination result in step ST139 is Yes, the processing of the driving support control apparatus 6 returns to step ST31 (see ST13 in FIG. 5), and in a case where the determination result is No, the processing transitions to step ST140.

In step ST140, the driving support control apparatus 6 determines whether or not one of the above-described first platooning cancel conditions (1d) to (6d) is met. In a case where the determination result in step ST140 is Yes, the processing of the driving support control apparatus 6 transitions to step ST32 so that the control mode is set at the standby mode (see ST6 in FIG. 5), and in a case where the determination result is No, the processing transitions to step ST141.

In step ST141, the driving support control apparatus 6 determines whether or not the setting screen call operation on the setting button 45 by the rider is accepted. In a case where the determination result in step ST141 is Yes, the processing of the driving support control apparatus 6 transitions to step ST71, and in a case where the determination result is No, the processing transitions to step ST142.

In step ST142, the driving support control apparatus 6 determines whether or not a distance between preceding vehicles that is a distance between the offset preceding vehicle and the front preceding vehicle is equal to or greater than a distance threshold. In a case where the determination result in step ST142 is Yes, the processing of the driving support control apparatus 6 transitions to step ST132 so that the offset preceding vehicle is set as the tracking target, and in a case where the determination result is No, the processing returns to step ST138.

According to the driving support system 1 of a motorcycle according to the present embodiment, the following effects are provided.

(1) In the driving support system 1, while an offset preceding vehicle traveling laterally ahead of the own vehicle and a front preceding vehicle traveling ahead of the offset preceding vehicle along a traveling direction and traveling at a closer position than the offset preceding vehicle along a vehicle width direction are recognized on the basis of forward information, that is, while the own vehicle is traveling at the third or subsequent position from a lead vehicle in traveling in a zigzag manner by three or more motorcycles, the driving support control apparatus 6 sets the offset preceding vehicle as a tracking target in a case where a distance between preceding vehicles that is a distance between the offset preceding vehicle and the front preceding vehicle is equal to or greater than a predetermined distance threshold, and sets the front preceding vehicle as the tracking target in a case where the distance between the preceding vehicles is less than the distance threshold. By this means, in a case where the offset preceding vehicle ahead of the own vehicle is traveling while keeping an appropriate distance from the front preceding vehicle traveling laterally ahead of the offset preceding vehicle, it is possible to cause the own vehicle to automatically track the offset preceding vehicle traveling laterally ahead of the own vehicle while keeping an appropriate distance between vehicles. Further, in a case where the front preceding vehicle decelerates for some reason, and as a result, the distance between the offset preceding vehicle and the front preceding vehicle becomes shorter, it is possible to cause the own vehicle to automatically track the front preceding vehicle traveling ahead of the own vehicle in the traveling direction while keeping an appropriate distance between vehicles. Thus, according to the driving support system 1, the tracking target can be automatically switched at an appropriate timing in accordance with acceleration and deceleration of the offset preceding vehicle and the front preceding vehicle traveling ahead of the own vehicle, so that it is possible to reduce a burden on a rider of the own vehicle during traveling in a zigzag manner.

(2) In the driving support system 1, the driving support control apparatus 6 includes a first platooning mode, a second platooning mode and a normal tracking mode as control modes of tracking control and can execute tracking control under one of the control modes. In the first platooning mode, while the offset preceding vehicle and the front preceding vehicle are recognized, that is, while the own vehicle is traveling at the third or subsequent position from the lead vehicle in traveling in a zigzag manner by three or more saddle type vehicles, the driving support control apparatus 6 sets the tracking target on the basis of the distance between the preceding vehicles. In the second platooning mode, while an offset preceding vehicle traveling laterally ahead of the own vehicle and an offset subsequent vehicle traveling laterally behind the own vehicle are recognized on the basis of forward information and rearward information, that is, while the own vehicle is traveling at the second position from the lead vehicle in traveling in a zigzag manner by three or more saddle type vehicles, the driving support control apparatus 6 sets the offset preceding vehicle as the tracking target. Thus, according to the driving support system 1, by performing tracking control under one of the first and the second platooning modes, it is possible to reduce a burden on a rider while the own vehicle is traveling at a position other than the lead vehicle in traveling in a zigzag manner by three or more saddle type vehicles. Further, in the normal tracking mode, the driving support control apparatus 6 sets the preceding vehicle recognized on the basis of the forward information as the tracking target. Thus, according to the driving support system 1, it is possible to cause the own vehicle to automatically track the arbitrarily determined tracking target, so that it is possible to reduce a burden on the rider during traveling.

(3) In the driving support system 1, after the image in FIG. 11 indicating that tracking control can be executed under the first platooning mode is displayed at the display 41, in a case where approval operation on the setting button 45 is accepted, the driving support control apparatus 6 starts tracking control under the first platooning mode. In other words, according to the driving support system 1, tracking control under the first platooning mode is started after approval operation by the rider, so that it is possible to prevent the own vehicle from traveling in a zigzag manner with a group not intended by the rider while the rider does not intend to travel in a zigzag manner with the group.

(4) In the driving support system 1, after the image in FIG. 8 indicating that tracking control can be executed under the second platooning mode is displayed at the display 41, in a case where approval operation on the setting button 45 is accepted, the driving support control apparatus 6 starts tracking control under the second platooning mode. In other words, according to the driving support system 1, tracking control is started under the second platooning mode after approval operation by the rider, so that it is possible to prevent the own vehicle from traveling in a zigzag manner with a group not intended by the rider while the rider does not intend to travel in a zigzag manner with the group.

(5) In the driving support system 1, in a case where a series of first mode setting operation on the setting button 45 is accepted, the driving support control apparatus 6 starts tracking control under the first platooning mode in response to an offset preceding vehicle and a front preceding vehicle that satisfy the first platooning conditions (1*c*) to (3*c*) being recognized on the basis of the forward information. Thus, according to the driving support system 1, in a case where the rider tries to travel in a zigzag manner at the third or subsequent position from the lead vehicle by receiving support by the tracking control, the rider performs first mode setting operation on the setting button 45 and adjusts own vehicle speed and the position so as to satisfy the first platooning conditions (1*c*) to (3*c*), thereby it is possible to automatically start tracking control under the first platooning mode.

(6) In the driving support system 1, in a case where a series of second mode setting operation on the setting button 45 is accepted, the driving support control apparatus 6 starts tracking control under the second platooning mode in response to an offset preceding vehicle and an offset subsequent vehicle that satisfy the second platooning conditions (1*a*) to (2*a*) being recognized on the basis of the forward information and the rearward information. Thus, according to the driving support system 1, in a case where the rider tries to travel in a zigzag manner at the second position from the lead vehicle by receiving support by tracking control, the rider performs second mode setting operation on the setting button 45 and adjusts own vehicle speed and the position so as to satisfy the second platooning conditions (1*a*) to (2*a*), thereby it is possible to automatically start tracking control under the second platooning mode.

(7) In the driving support system 1, the driving support control apparatus 6 sets speed obtained by adding a predetermined value to own vehicle speed at the time of start of tracking control under the first platooning mode as setting vehicle speed and causes the own vehicle to automatically track the tracking target within a range in which the own vehicle speed does not exceed the setting vehicle speed. Thus, according to the driving support system 1, even in a case where the tracking target somewhat increases speed after tracking control is started, it is possible to cause the own vehicle to track this tracking target. Further, in a case where vehicle speed of the tracking target constantly exceeds the setting vehicle speed, the driving support control apparatus 6 cancels tracking control. Thus, according to the driving support system 1, it is possible to prevent the own vehicle from accelerating to a speed range exceeding ability of the rider due to tracking of the tracking target traveling at vehicle speed exceeding the setting vehicle speed.

(8) In the driving support system 1, the driving support control apparatus 6 sets speed obtained by adding a predetermined value to own vehicle speed at the time of start of tracking control under the second platooning mode as setting vehicle speed and causes the own vehicle to automatically track the tracking target within a range in which the own vehicle speed does not exceed the setting vehicle speed. Thus, according to the driving support system 1, even in a case where the tracking target somewhat increases speed after tracking control is started, it is possible to cause the own vehicle to track this tracking target. Further, in a case where vehicle speed of the tracking target constantly exceeds the setting vehicle speed, the driving support control apparatus 6 cancels tracking control. Thus, according to the driving support system 1, it is possible to prevent the own vehicle from accelerating to a speed range exceeding ability of the rider due to tracking of the tracking target traveling at vehicle speed exceeding the setting vehicle speed.

(9) In the driving support system 1, in a case where the offset preceding vehicle decelerates for some reason and goes out of the detection range 22R of the forward radar unit while tracking control is executed under the second platooning mode, the driving support control apparatus 6 estimates a position of the offset preceding vehicle on the basis of a position of a front end portion of the offset subsequent vehicle that tries to keep a predetermined distance between vehicles with respect to the offset preceding vehicle and continuously executes tracking control on the basis of the estimation result. Thus, according to the driving support system 1, even in a case where the offset preceding vehicle that is the tracking target decelerates for some reason, and the offset preceding vehicle and the own vehicle travel side by side while tracking control is executed under the second platooning mode, it is possible to continue tracking control with respect to this virtual offset preceding vehicle.

While one embodiment of the present invention has been described above, the present invention is not limited to this embodiment. Detailed configurations may be changed as appropriate within a range of the gist of the present invention.

What is claimed is:

1. A driving support system comprising:

a forward information acquirer configured to acquire forward information regarding a state ahead of an own vehicle that is a saddle type vehicle;

a rearward information acquirer configured to acquire rearward information regarding a state behind the own vehicle; and a driving support controller configured to set a preceding vehicle recognized on a basis of the forward information as a tracking target and execute tracking control of causing the own vehicle to automatically track the tracking target, wherein the driving support controller includes as control modes of the tracking control, a first platooning mode in which while a first preceding vehicle that is a saddle type vehicle traveling laterally ahead of the own vehicle and a second preceding vehicle that is a saddle type vehicle traveling ahead of the first preceding vehicle along a traveling direction and traveling at a closer position than the first preceding vehicle along a vehicle width direction are recognized on a basis of the forward information, the driving support controller sets the first preceding vehicle as the tracking target in a case where a distance between preceding vehicles that is a distance between the first preceding vehicle and the second preceding vehicle is greater than a predetermined distance threshold, and sets the second preceding vehicle as the tracking target in a case where the distance between the preceding vehicles is less than the distance threshold, and a second platooning mode in which while an offset preceding vehicle that is a saddle type vehicle traveling laterally ahead of the own vehicle and an offset subsequent vehicle that is a saddle type vehicle traveling laterally behind the own vehicle are recognized on a basis of the forward information and the rearward information, the offset preceding vehicle is set as the tracking target, and is capable of executing the tracking control under one of the control modes, and wherein in a case where the offset preceding vehicle goes out of a detection range of the forward information acquirer while the tracking control is executed under the second platooning mode, the driving support controller sets a virtual offset preceding vehicle determined on the basis of the rearward information as the tracking target.

2. The driving support system according to claim 1, wherein the driving support controller further includes as control modes of the tracking control, a normal tracking mode in which a preceding vehicle recognized on a basis of the forward information is set as the tracking target, and is capable of executing the tracking control under one of the control modes.

3. The driving support system according to claim 2, further comprising:

an information presenter configured to, in a case where the first preceding vehicle and the second preceding vehicle that satisfy a predetermined first platooning condition are recognized on a basis of the forward information, present first information indicating that the tracking control is executable under the first platooning mode to a rider of the own vehicle; and an operation accepter configured to accept approval operation by the rider, wherein in a case where the approval operation is accepted by the operation accepter after the first information is presented by the information presenter, the driving support controller starts the tracking control under the first platooning mode.

4. The driving support system according to claim 3, wherein, in a case where the offset preceding vehicle and the offset subsequent vehicle that satisfy a predetermined second platooning condition are recognized on a basis of the forward information and the rearward information, the information presenter presents second information indicating that the tracking control is executable under the second platooning mode to the rider, and in a case where the approval operation is accepted by the operation accepter after the second information is presented by the information presenter, the driving support controller starts the tracking control under the second platooning mode.

5. The driving support system according to claim 2, further comprising an operation accepter configured to accept setting operation by a rider, wherein in a case where first mode setting operation for setting the first platooning mode as one of the control modes is accepted by the operation accepter, the driving support controller starts the tracking control under the first platooning mode in response to the first preceding vehicle and the second preceding vehicle that satisfy a predetermined first platooning condition being recognized on a basis of the forward information.

6. The driving support system according to claim 5, wherein in a case where second mode setting operation for setting the second platooning mode as one of the control modes is accepted by the operation accepter, the driving support controller starts the tracking control under the second platooning mode in response to the offset preceding vehicle and the offset subsequent vehicle that satisfy a predetermined second platooning condition being recognized on a basis of the forward information and the rearward information.

7. The driving support system according to claim 2, wherein the driving support controller sets speed obtained by adding a predetermined value to own vehicle speed at a time of start of the tracking control under the first platooning mode as setting vehicle speed, causes the own vehicle to automatically track the tracking target within a range in which the own vehicle speed does not exceed the setting vehicle speed, and in a case where vehicle speed of the tracking target constantly exceeds the setting vehicle speed, cancels the tracking control.

8. The driving support system according to claim 3, wherein the driving support controller sets speed obtained by adding a predetermined value to own vehicle speed at a time of start of the tracking control under the first platooning mode as setting vehicle speed, causes the own vehicle to automatically track the tracking target within a range in which the own vehicle speed does not exceed the setting vehicle speed, and in a case where vehicle speed of the tracking target constantly exceeds the setting vehicle speed, cancels the tracking control.

9. The driving support system according to claim 4, wherein the driving support controller sets speed obtained by adding a predetermined value to own vehicle speed at a time of start of the tracking control under the first platooning mode as setting vehicle speed, causes the own vehicle to automatically track the tracking target within a range in which the own vehicle speed does not exceed the setting vehicle speed, and in a case where vehicle speed of the tracking target constantly exceeds the setting vehicle speed, cancels the tracking control.

10. The driving support system according to claim 6, wherein the driving support controller sets speed obtained by adding a predetermined value to own vehicle speed at a time of start of the tracking control under the first platooning mode as setting vehicle speed, causes the own vehicle to automatically track the tracking target within a range in which the own vehicle speed does not exceed the setting vehicle speed, and in a case where vehicle speed of the tracking target constantly exceeds the setting vehicle speed, cancels the tracking control.

11. The driving support system according to claim 2, wherein the driving support controller sets speed obtained by adding a predetermined value to own vehicle speed at a time of start of the tracking control under the second platooning mode as setting vehicle speed, causes the own vehicle to automatically track the tracking target within a range in which the own vehicle speed does not exceed the setting vehicle speed, and in a case where vehicle speed of the tracking target constantly exceeds the setting vehicle speed, cancels the tracking control.

12. The driving support system according to claim 3, wherein the driving support controller sets speed obtained by adding a predetermined value to own vehicle speed at a time of start of the tracking control under the second platooning mode as setting vehicle speed, causes the own vehicle to automatically track the tracking target within a range in which the own vehicle speed does not exceed the setting vehicle speed, and in a case where vehicle speed of the tracking target constantly exceeds the setting vehicle speed, cancels the tracking control.

13. The driving support system according to claim 4, wherein the driving support controller sets speed obtained by adding a predetermined value to own vehicle speed at a time of start of the tracking control under the second platooning mode as setting vehicle speed, causes the own vehicle to automatically track the tracking target within a range in which the own vehicle speed does not exceed the setting vehicle speed, and in a case where vehicle speed of the tracking target constantly exceeds the setting vehicle speed, cancels the tracking control.

14. The driving support system according to claim 6, wherein the driving support controller sets speed obtained by adding a predetermined value to own vehicle speed at a time of start of the tracking control under the second platooning mode as setting vehicle speed, causes the own vehicle to automatically track the tracking target within a range in which the own vehicle speed does not exceed the setting vehicle speed, and in a case where vehicle speed of the tracking target constantly exceeds the setting vehicle speed, cancels the tracking control.

15. The driving support system according to claim 2, wherein in a case where the offset preceding vehicle decelerates and goes out of a detection range of the forward information acquirer while the tracking control is executed under the second platooning mode, the driving support controller estimates a position of the offset preceding vehicle on a basis of a position of a front end portion of the offset subsequent vehicle recognized on a basis of the rearward information and continuously executes the tracking control on a basis of a result of the estimation.

16. The driving support system according to claim 3, wherein in a case where the offset preceding vehicle decelerates and goes out of a detection range of the forward information acquirer while the tracking control is executed under the second platooning mode, the driving support controller estimates a position of the offset preceding vehicle on a basis of a position of a front end portion of the offset subsequent vehicle recognized on a basis of the rearward information and continuously executes the tracking control on a basis of a result of the estimation.

17. The driving support system according to claim 4, wherein in a case where the offset preceding vehicle decelerates and goes out of a detection range of the forward information acquirer while the tracking control is executed under the second platooning mode, the driving support controller estimates a position of the offset preceding vehicle on a basis of a position of a front end portion of the offset subsequent vehicle recognized on a basis of the rearward information and continuously executes the tracking control on a basis of a result of the estimation.

18. The driving support system according to claim 6, wherein in a case where the offset preceding vehicle decelerates and goes out of a detection range of the forward information acquirer while the tracking control is executed under the second platooning mode, the driving support controller estimates a position of the offset preceding vehicle on a basis of a position of a front end portion of the offset subsequent vehicle recognized on a basis of the rearward information and continuously executes the tracking control on a basis of a result of the estimation.

* * * * *